(12) United States Patent
Barnett

(10) Patent No.: US 10,852,945 B2
(45) Date of Patent: Dec. 1, 2020

(54) GENERATING SOCIAL MEDIA COMMUNICATIONS BASED ON LOW-DATA MESSAGES

(71) Applicant: Facebook, Inc., Menlo Park, CA (US)

(72) Inventor: John Samuel Barnett, Newark, CA (US)

(73) Assignee: FACEBOOK, INC., Menlo Park, CA (US)

( * ) Notice: Subject to any disclaimer, the term of this patent is extended or adjusted under 35 U.S.C. 154(b) by 225 days.

(21) Appl. No.: 15/668,249

(22) Filed: Aug. 3, 2017

(65) Prior Publication Data

US 2019/0042085 A1 Feb. 7, 2019

(51) Int. Cl.

| | |
|---|---|
| *G06F 9/44* | (2018.01) |
| *G06F 3/0489* | (2013.01) |
| *G06F 16/435* | (2019.01) |
| *G06F 9/451* | (2018.01) |
| *G06F 3/0481* | (2013.01) |
| *G06F 8/38* | (2018.01) |
| *G06Q 50/00* | (2012.01) |

(52) U.S. Cl.
CPC ........ *G06F 3/04895* (2013.01); *G06F 3/0481* (2013.01); *G06F 8/38* (2013.01); *G06F 9/44* (2013.01); *G06F 9/453* (2018.02); *G06F 16/437* (2019.01); *G06Q 50/01* (2013.01)

(58) Field of Classification Search
CPC ...... G06F 3/04895; G06F 16/437; G06F 9/44; G06Q 50/01
See application file for complete search history.

(56) References Cited

U.S. PATENT DOCUMENTS

| | | | | |
|---|---|---|---|---|
| 8,849,931 | B2 * | 9/2014 | Linner ................. | G06F 40/117 709/206 |
| 8,892,666 | B1 * | 11/2014 | Jackson ................. | H04L 51/32 709/203 |
| 8,938,450 | B2 * | 1/2015 | Spivack ................ | G06F 17/275 707/723 |
| 9,412,136 | B2 * | 8/2016 | Gertzfield .............. | G06Q 50/01 |
| 9,521,105 | B2 * | 12/2016 | Jackson ................. | H04L 51/20 |
| 9,596,206 | B2 * | 3/2017 | Bueno .................... | H04L 51/08 |
| 9,858,494 | B2 * | 1/2018 | Chen ..................... | G06K 9/4652 |
| 9,930,078 | B2 * | 3/2018 | Rajaram ................ | H04L 51/28 |
| 9,978,068 | B2 * | 5/2018 | Butterfield ........... | G06Q 20/405 |

(Continued)

*Primary Examiner* — Maikhanh Nguyen
(74) *Attorney, Agent, or Firm* — Keller Jolley Preece

(57) ABSTRACT

The present disclosure is directed toward systems and methods for enabling a user to manage a social media account via low-data messages. The systems and methods may include receiving a low-data message from a client device, analyzing the low-data message, generating a social media object relating to the low-data message, and adding the social media object to a social media account of a social networking system. Furthermore, the systems and methods may include detecting a user interaction with the social media object, generating a second low-data message describing the user interaction, providing the second low-data message to the client device, and receiving a third low-data message from the client device. Moreover, the systems and methods include generating a response social media object relating to the third low-data message and adding the response social media object to the social media account within the social networking system.

20 Claims, 11 Drawing Sheets

(56) References Cited

U.S. PATENT DOCUMENTS

| | | | |
|---|---|---|---|
| 10,223,464 B2* | 3/2019 | Winstanley | G06F 16/951 |
| 10,225,220 B2* | 3/2019 | Pickett | H04L 51/16 |
| 10,242,074 B2* | 3/2019 | Kazi | G06F 16/248 |
| 10,270,882 B2* | 4/2019 | Kazi | G06F 40/284 |
| 10,277,550 B2* | 4/2019 | Chen | G06Q 50/01 |
| 10,333,873 B2* | 6/2019 | Perez | G06Q 10/0639 |
| 10,387,511 B2* | 8/2019 | Evnine | G06F 16/9536 |
| 10,515,081 B2* | 12/2019 | Birchall | H04L 67/306 |
| 2012/0174157 A1* | 7/2012 | Stinson, III | H04N 5/44543 725/40 |
| 2012/0239761 A1* | 9/2012 | Linner | H04W 4/14 709/206 |
| 2013/0254309 A1* | 9/2013 | Jackson | H04L 51/32 709/206 |
| 2013/0268973 A1* | 10/2013 | Archibong | G06Q 50/01 725/51 |
| 2014/0012927 A1* | 1/2014 | Gertzfield | G06Q 50/01 709/206 |
| 2014/0068649 A1* | 3/2014 | Badros | H04L 65/4084 725/19 |
| 2014/0068654 A1* | 3/2014 | Marlow | H04L 65/4084 725/28 |
| 2014/0108562 A1* | 4/2014 | Panzer | G06Q 10/10 709/206 |
| 2014/0136544 A1* | 5/2014 | Spivack | G06F 17/275 707/741 |
| 2014/0180788 A1* | 6/2014 | George | G06Q 30/0269 705/14.41 |
| 2014/0189530 A1* | 7/2014 | Anand | H04L 65/403 715/753 |
| 2016/0007096 A1* | 1/2016 | Badros | H04L 65/4084 725/34 |
| 2016/0072758 A1* | 3/2016 | Archibong | H04L 65/4084 |
| 2016/0092551 A1* | 3/2016 | Tang | G06F 16/9535 707/740 |
| 2016/0104132 A1* | 4/2016 | Abbatiello | G06Q 20/10 705/39 |
| 2016/0104159 A1* | 4/2016 | Butterfield | G06Q 20/405 705/44 |
| 2016/0156574 A1* | 6/2016 | Hum | H04L 51/046 715/752 |
| 2016/0170991 A1* | 6/2016 | Birchall | H04L 12/1859 707/751 |
| 2016/0188597 A1* | 6/2016 | Moore | G06F 16/24578 707/749 |
| 2016/0294799 A1* | 10/2016 | Miller | H04N 21/4788 |

\* cited by examiner

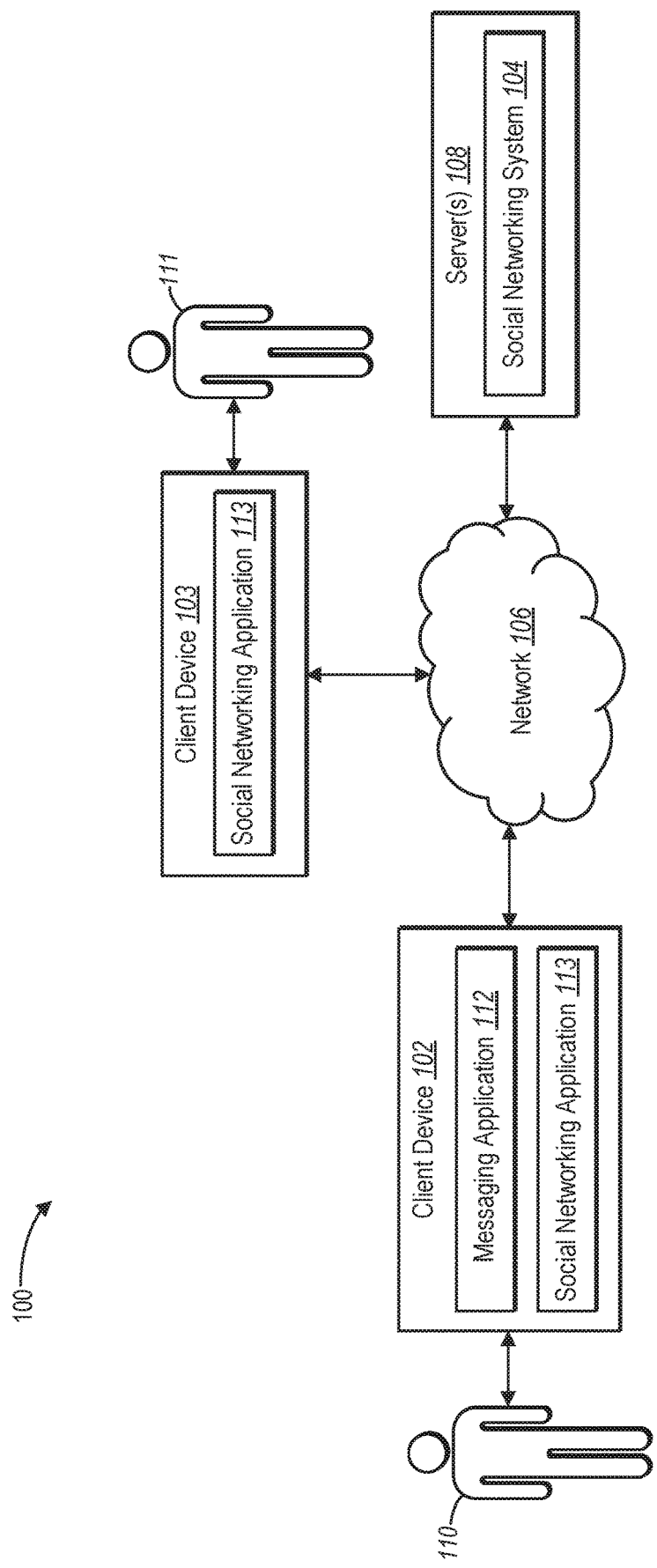

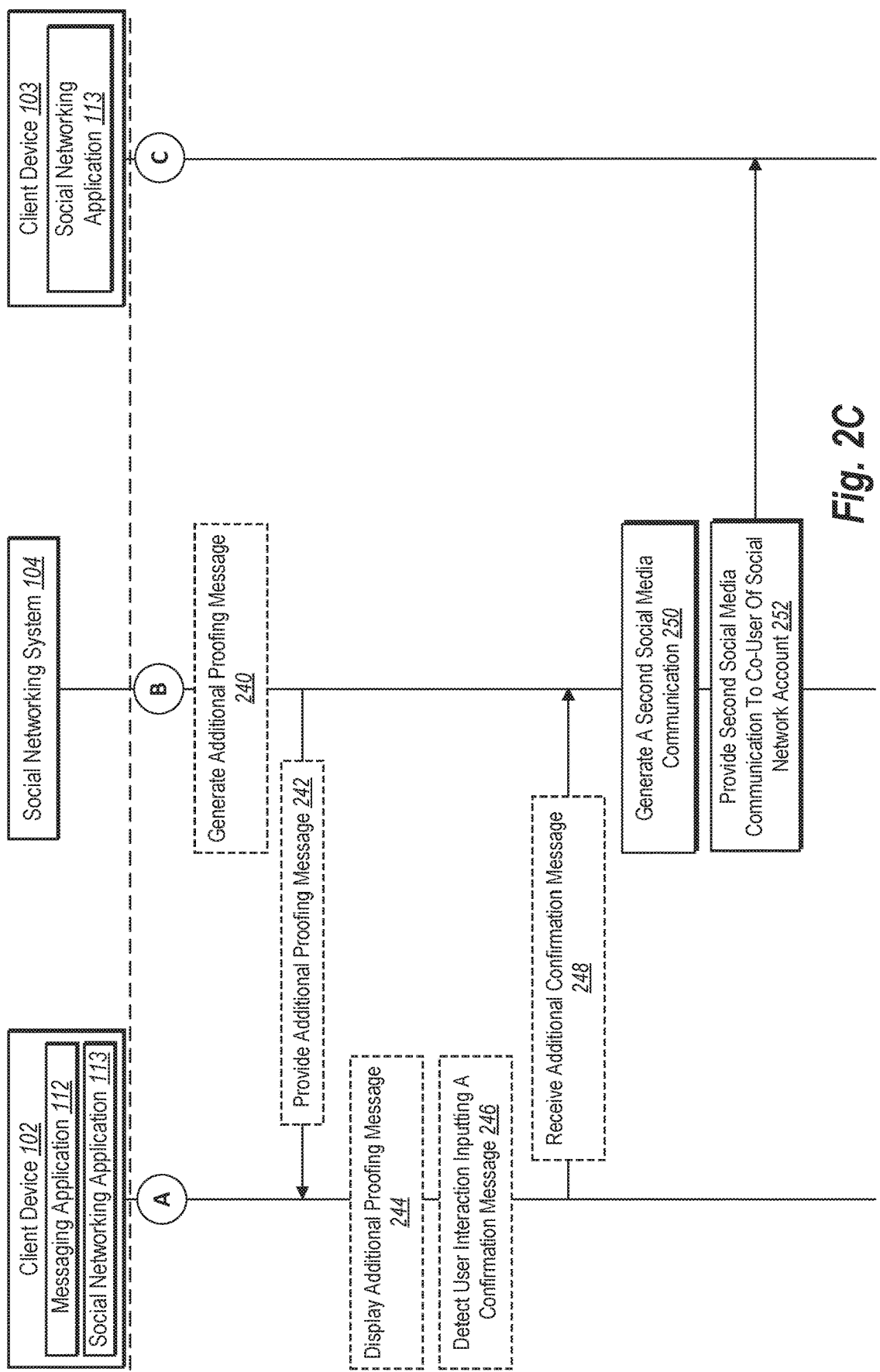

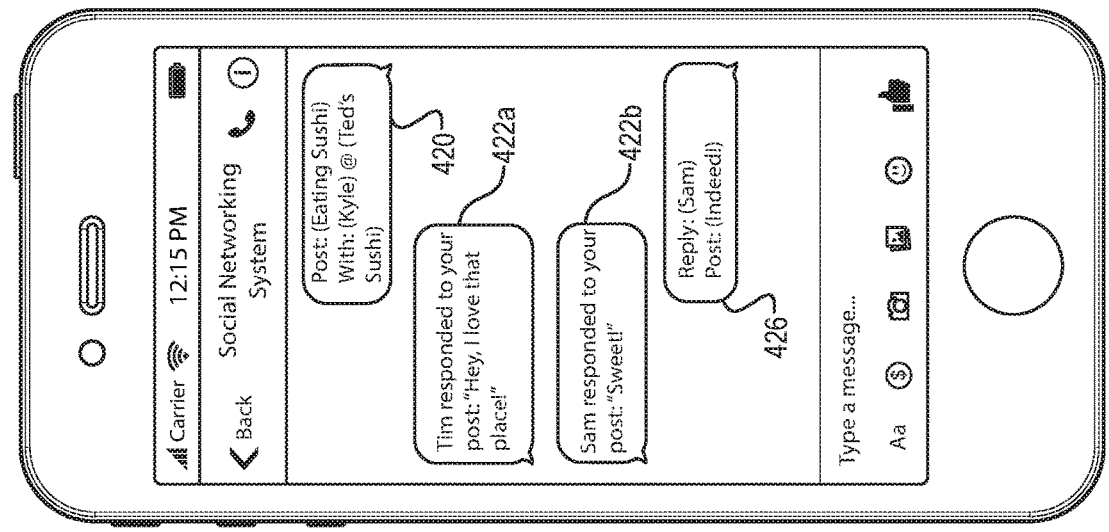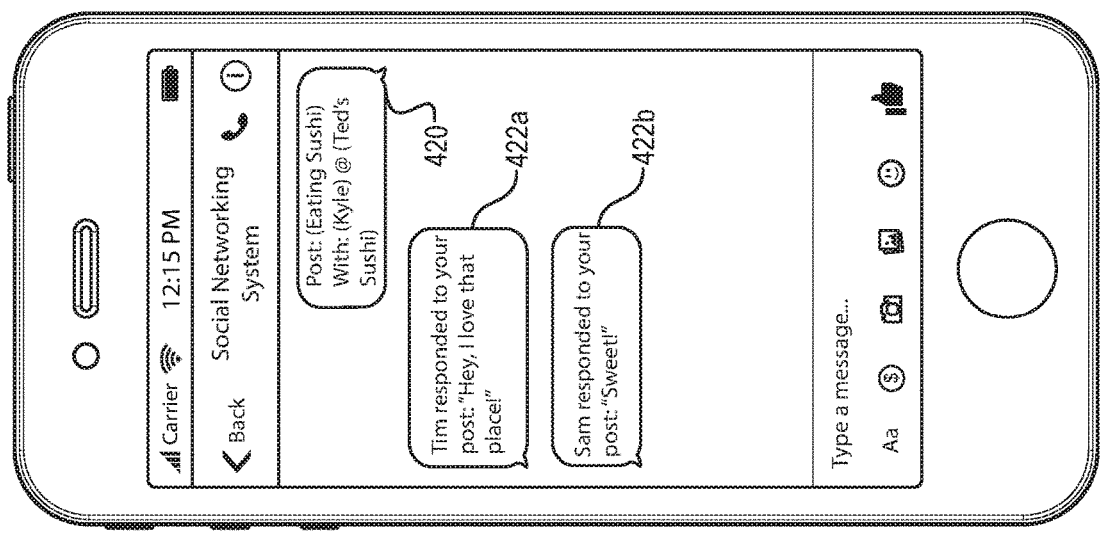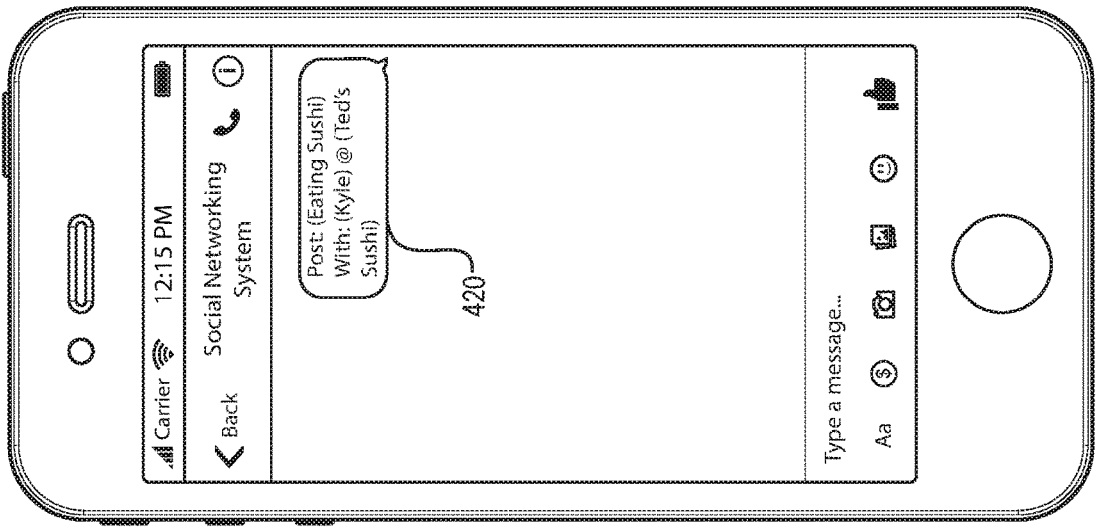

GENERATING SOCIAL MEDIA COMMUNICATIONS BASED ON LOW-DATA MESSAGES

BACKGROUND

Social networking systems have given people the ability to connect, share, and communicate like never before. Billions of users from all walks of life and from countries throughout the world regularly use social networking systems to communicate and share content with friends and family. The availability of social networking systems has now reached third world countries and other underdeveloped areas, bringing people from those areas the opportunity to access content, information, and communication capabilities previously unavailable to those areas of the world. However, conventional systems and users of those systems are still hindered by technological limitations in some areas and/or personal circumstances.

For example, social networking systems typically require users to access the social networking systems via one or more of websites (e.g., accessed using a web browser) and/or native social networking applications. However, conventional methods for accessing a social networking system typically utilize a relatively significant amount of data. This can cause problems for mobile device users with limited data plans. For example, the amount of data necessary to access and enjoy the benefits of a social networking system can become prohibitive, especially for users who may not have regular access to Wi-Fi or other data networks. Furthermore, given the limitations of conventional systems, using and accessing social media may not even be possible in underdeveloped areas of the world without mobile data networks capable of providing sufficient data bandwidth to access and enjoy the features of social networking systems.

Accordingly, these and other disadvantages exist with respect to conventional methods and systems for using, accessing, and managing social media.

SUMMARY

One or more embodiments described herein provide benefits and/or solve one or more of the foregoing or other problems in the art with systems and methods for using, accessing, and managing social media. Particularly, some embodiments of the present disclosure include systems and methods for enabling a user to access and communicate through a social networking system via low-data messages (e.g., short message service (SMS) messages). Furthermore, embodiments of the present disclosure include systems and methods for enabling a user to be apprised of activity (e.g., activity by other users of the social networking system) associated with the user's social media account via low-data messages. Thus, the disclosed systems and methods facilitate users to access, use, and manage social media accounts in locations and/or circumstances in which the users may not otherwise have such an opportunity. For example, the disclosed systems and methods may enable users having strictly "talk and text" cellular plans to access, use, and communicate through a social networking system via their mobile devices.

Additional embodiments of the present disclosure include systems and methods for initially communicating with the user via a notification and then enabling the user to access, use, and manage social media without requiring full access to a corresponding website or application. For example, the notification can include information in regard to the user's location, proximity to other users, events, reminders, content usage, etc. Furthermore, the systems and methods enable the user to manage (e.g., post to) the user's social media account via responses to the notifications (e.g., within the notification interface). Thus, because the systems and methods initially communicate with the user via a notification and enable to the user to manage the user's social media account via responses to the notifications, the systems and methods provide a more connected experience for a user who may not be able to access a social media account via typical methods such as a website and/or native application.

Additional features and advantages of the present invention will be set forth in the description that follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which:

FIG. 1 illustrates a schematic diagram of an environment for implementing a communication system according to one or more embodiments of the present disclosure;

FIGS. 2A-2C illustrate a sequence-flow diagram illustrating interactions in a communication process between a client device and a social networking system according to one or more embodiments of the present disclosure;

FIGS. 4A-4C illustrate a flow of user interfaces including features of the communication system in accordance with one or more embodiments;

DETAILED DESCRIPTION

Figure 2A:
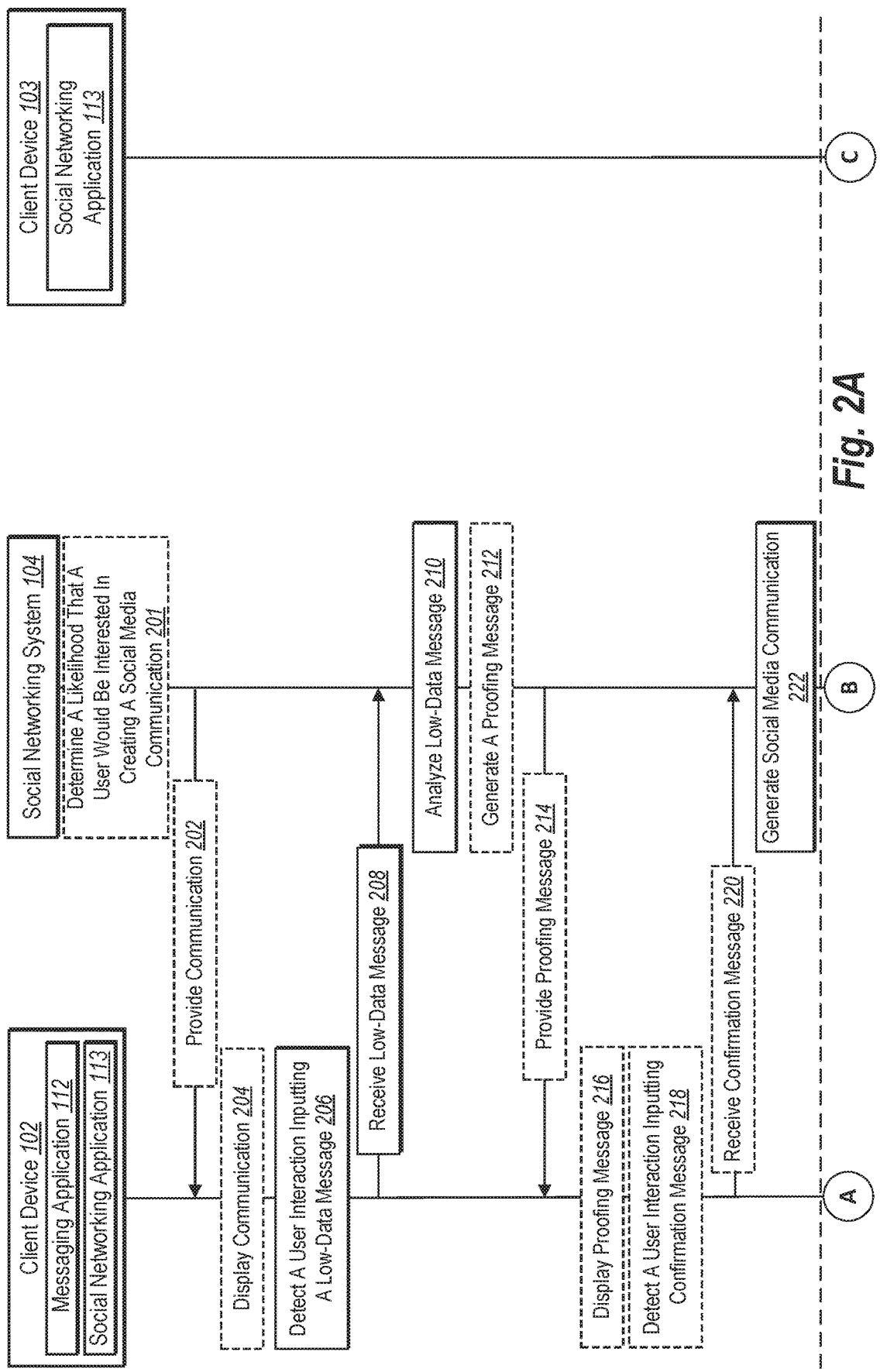

Embodiments of the present disclosure include a social networking system that enables a user via a client device (e.g., a user via a client device) to manage (e.g., post to, add content to, update, etc.) a social media account via low-data messages (e.g., short message service (SMS) messaging). Additional embodiments of the present disclosure include a social networking a social networking system that enables a user via a client device (e.g., a user via a client device) to be kept apprised (e.g., updated) of activity (e.g., activity by additional users (i.e., posts, message, replies, etc.)) on the user's social media account via low-data messaging.

In particular, the social networking system can implement systems, algorithms, and methods for facilitating use of the social networking system via low-data messaging. For example, in some embodiments, the social networking system receives a low-data message from a user of the social networking system (e.g., sent using a client device, such as a cellular phone), and then analyzes the low-data message to identify content to post to or otherwise communicate via a social media account and/or commands for actions to take with respect to the user's social media account. Based on the analysis, the social networking system can generate a social media communication (a post, a message, etc.) and add the social media communication to the user's account. Additionally, the social networking system can detect user interactions (e.g., by co-users of the social networking system) with the social media communication and notify the user of such user interactions by way of one or more low-data messages sent to the user.

Because the social networking system enables a user to access, use, and manage a social media account via low-data messages, the social networking system is advantageous. For example, unlike convention systems for accessing, using, and managing social media accounts, the social networking system of the present disclosure provides users, who may not typically have access to social media (e.g., a social networking system), the opportunity and/or ability to access, use, and manage social media. For instance, in areas of the world not having sufficient cellular signals for significant data transmission, users can access, use, and manage social media via low-data messages (e.g., SMS messages). Furthermore, the social networking system enables users having strictly "talk and text" cellular plans to access, use, and manage social media via their mobile devices. As a result, the social networking system of the present disclosure provides more access to social media than conventional systems. Furthermore, the social networking system can provide a more connected and immediate social media experience for the user even if the user is unable to fully access the social networking system (e.g., due to data restrictions or unavailability).

Furthermore, the social networking system described herein provides improvements in the performance of a computer system (e.g., a computer system of a mobile device). For example, as will be discussed in greater detail below, because the social networking system does not require operation of a web browser and/or a social media specific application, the social networking system reduces required processing power, memory, and resources needed to access, use, and manage social media accounts in comparison to conventional systems. For example, the social networking system does not require the computer system to load (e.g., download) a social networking system user interface, a newsfeed, advertisements, etc. in order to give the user access to the social networking system. In other words, the social networking system results in less required processing power and communication bandwidth in comparison to conventional systems.

As used herein, the term "low-data message" refers to an electronic message (e.g., a text message) that requires a relatively low amount of data to send and/or receive. For example, in some embodiments, a low-data message refers to a short message service (SMS) message. In other embodiments, a low-data message can be a multimedia messaging service (MMS) message, an extensible messaging and presence protocol (XMPP) message, a session initiation protocol (SIP) message, an internet relay chat (IRC) message, an enhanced message service (EMS) message, an iMessage message, etc. In some embodiments, a low-data message's content consists primarily or entirely of alpha-numeric characters. Furthermore, a low-data message can refer to an electronic message sent by a client device using a messaging application that is independent of conventional social networking applications, such as a native social networking application or a web-based social networking application accessed using a browser. Accordingly, it is not necessary for a computing device to use the data typically required to access the social networking system or corresponding applications to create and send social media communications, as explained in more detail below.

As used herein, the term "social media communication" refers to an electronic communication posted, sent, or otherwise communicated by way of or in association with a social media account of a social networking system. For example, a social media communication can be a post, a message (e.g., a direct message), a comment, or a reply from a user of the social networking system to be provided to one or more co-users of the social networking system. Furthermore, social media communications can include a variety of content, such as text, images, links, video clips, and/or audio clips.

FIG. 1 illustrates a schematic diagram of a communication system 100 according to an embodiment of the present disclosure. As shown in FIG. 1, the communication system 100 may include various components for performing the processes and features described herein. For example, the communication system 100 includes at least one client device 102 and a social networking system 104 on one or more server(s) 108, which are communicatively coupled through a network 106. As used herein, the term "social networking system" refers to a system that supports and enables on-line communication, input, interaction, content sharing, and collaboration between users. Also as illustrated in FIG. 1, a user 110 interacts with the client device 102 in order to access content and/or services on or provided by the social networking system 104.

In some embodiments, the client device 102 may include a messaging application 112 for facilitating communication (e.g., reading, composing, and/or sending messages (e.g., SMS messages)) between the user 110 and third parties. For example, in some instances, the messaging application 112 can be an electronic messaging application (e.g., a messenger, chat application, text messenger, etc.). In one or more embodiments, as is discussed in greater detail in regard to FIGS. 2A-2C, the messaging application 112 of the client device 102 enables communication with (e.g., sending low-data messages to and receiving low-data messages from) the social networking system 104 via the network 106 and/or the one or more third-party communications servers or services (not shown).

In one or more embodiments, the messaging application 112 can be a native application installed on the client device 102. For example, the messaging application 112 may be a mobile application that installs and runs on a mobile device, such as a smart phone or a tablet. In some embodiments, the messaging application 112 facilitates the creation of low-data messages, such as SMS messages, to send to other client devices and/or the social networking system 104. The messaging application 112 can be a text messaging application that is native to the client device 102 and/or specific to an operating system of the client device 102. Further, the messaging application 112 can be independent of the social networking system 104 (i.e., the messaging application 112 is a generic messaging application not tied to the social networking system 104 and that does not use the social networking system 104 to send messages to other users). Alternatively, the messaging application 112 can be associated with the social networking system 104 and configured to send messages through the application.

In some embodiments, the client device 102 may include a social networking application 113 associated with the social networking system 104. For example, the social networking application 113 can be specific to the social networking system 104 and can allow the user 110 to access to access and interact with social networking content (e.g., posts, messages, profiles, etc.) of the social networking system 104 and/or communicate with other users of the social networking system 104. In some instances, the social networking application 113 of the client device 102 can access the social networking system 104 via the network 106. In one or more embodiments, the social networking application 113 can be a native application installed on the client device 102. For example, the social networking application 113 may be a mobile application that installs and runs on a mobile device, such as a smart phone or a tablet. Alternatively, the social networking application 113 can be a desktop application, widget, or other form of a native computer program. Alternatively, the social networking application 113 may be a remote application accessed by the client device 102. For example, the social networking application 113 may be a web application that is executed within a web browser of the client device 102.

The client device 102 and the social networking system 104 communicate via the network 106, which may include one or more networks and may use one or more communication platforms or technologies suitable for transmitting data and/or communication signals. In one or more embodiments, the network 106 includes a combination of cellular or mobile telecommunications networks, a public switched telephone network (PSTN), and/or the Internet or World Wide Web and facilitates the transmission of low-data messages between the client device 102 and the social networking system 104. The network 106, however, can include various other types of networks that use various communication technologies and protocols, such as a wireless local network (WLAN), a wide area network (WAN), a metropolitan area network (MAN), other telecommunication networks, or a combination of two or more of the foregoing networks. Additional details relating to the network 106 are explained below with reference to FIG. 8.

The user 110 can use the client device 102 to, for example, receive information related to activity associated with a social media account (e.g., the user's social media account) of the social networking system 104 and/or interact with components of the social networking system 104. For example, the user 110 can use the client device 102 to receive messages from and/or send messages to the social networking system 104. In some embodiments, the user 110 is an individual (i.e., human user of the social networking system 104). Although FIG. 1 illustrates only one user 110, it is understood that the communication system 100 can include a plurality of users, with each of the plurality of users interacting with the social networking system 104 using corresponding client devices.

In some embodiments, as illustrated, the communication system 100 can include an additional client device 103, and a co-user 111 can interact with the additional client device 103 in order to access content and/or services on or provided by the social networking system 104. For example, the additional client device 103 may include the social networking application 113 associated with the social networking system 104. Furthermore, the social networking application 113 can allow the co-user 111 to access and interact with the social networking system 104 and view activity of the user 110 within the social networking system 104.

The client device 102 and/or the additional client device 103 can be any one or more of various types of computing devices. For example, the client device 102 and/or the additional client device 103 may include a mobile device such as a mobile telephone, a smartphone, a PDA, a tablet, or a laptop, or a non-mobile device such as a desktop or another type of computing device. Additional details with respect to the client device 102 are discussed below with respect to FIG. 7.

The social networking system 104 can include one or more systems, servers, and/or other devices for providing social networking features and functionality to a plurality of users (e.g., the user 110 and the co-user 111). For example, in some embodiments, the social networking system 104 is implemented by a plurality of server devices that store user information and content, facilitate the creation and consumption of content by users, and/or facilitate communication between users of the social networking system 104. For instance, the social networking system 104 supports and enables on-line communication, input, interaction, content-sharing, and collaboration between users. As is discussed in greater detail below, in some embodiments, the social networking system 104 can receive messages (e.g., SMS messages) from the client device 102 via the messaging application 112, and based on the received messages, the social networking system 104 can generate a social media communication (e.g., a post). Furthermore, the social networking system 104 can provide the social media communication to the co-user 111 of the additional client device 103 via the social networking application 113. Moreover, based on detected activity within the social networking system 104, the social networking system 104 can send messages (e.g., SMS messages) to user 110 of the client device 102 describing the detected activity within the social networking system 104. Additional details related to the social networking system 104 are provided below with reference to FIGS. 8 & 9.

Figure 2B:
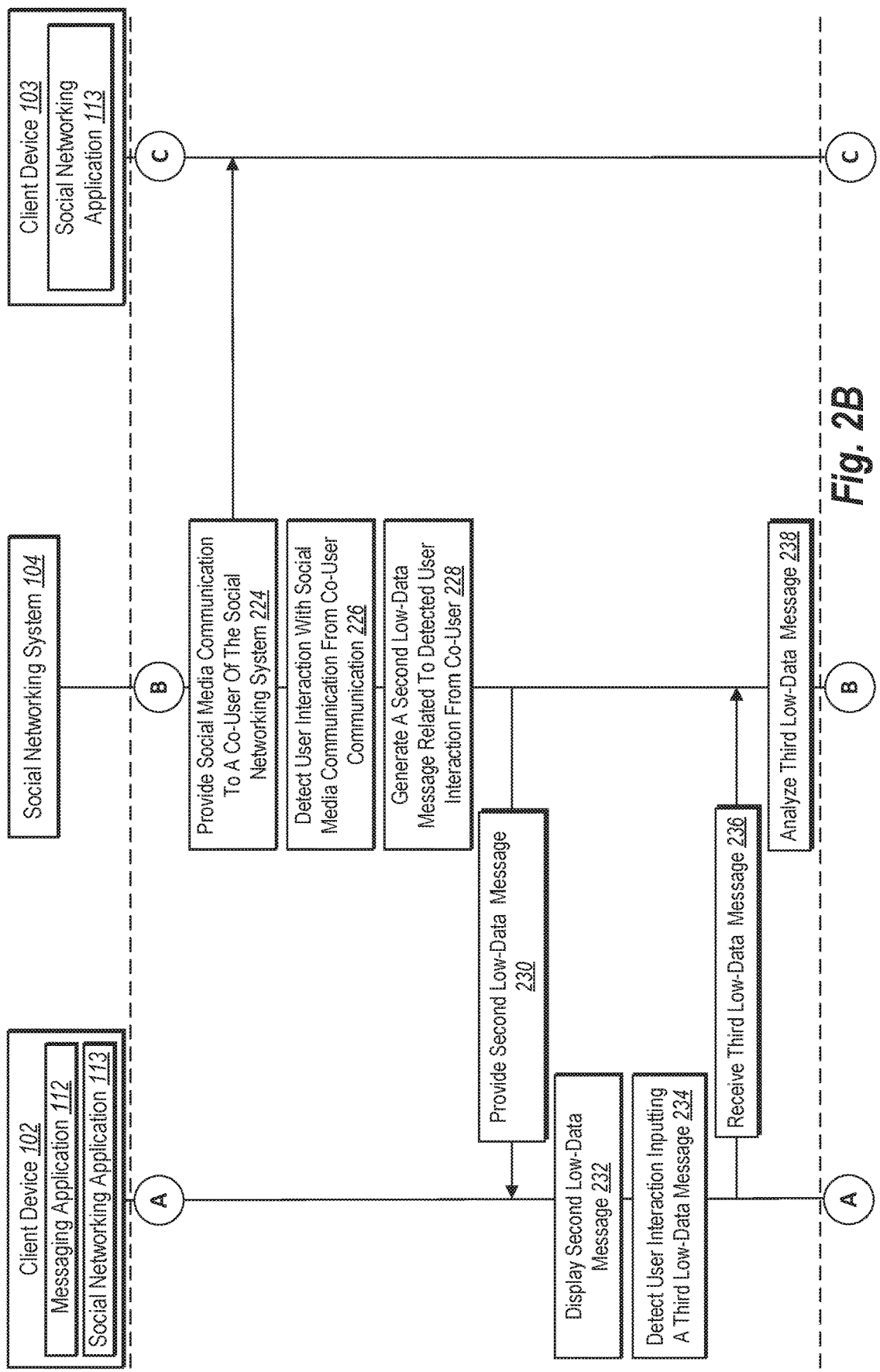

FIGS. 2A-2C illustrate a sequence-flow diagram 200 showing various steps of client device 102 and the social networking system 104, in accordance with various embodiments of facilitating communications between client devices and the social networking system 104. The client device 102, the additional client device 103, and the social networking system 104 shown in FIGS. 2A-2C may be example embodiments of the client device 102, the client device 103, and the social networking system 104 described in regard to FIG. 1.

As shown in step 201 of FIG. 2A, in some embodiments, the social networking system 104 can determine a likelihood that a user would like to create a social media communication. For example, the social networking system 104 can detect activity related to a social media account associated with the client device 102 (e.g., the user 110 of the client device 102), and based on the detected activity, the social networking system 104 can determine whether or not a user (e.g., user 110) would likely be interested in creating a social media communication (e.g., a post) in response to the activity. For instance, the detected activity can include messages, posts, events, advertisements, interactions by other users (e.g., likes and/or replies), or any other activity related to the social media account.

In additional embodiments, the social networking system 104 can detect other activities such as an event and/or occurrence related to the client device 102 (e.g., the user 110 of the client device 102). For example, the social networking system 104 can detect a location of the client device 102 (by interaction with a global positioning application), a proximity of other client devices (e.g., a gathering of client devices), an event, a reminder, a notification related to geography, a notification related to current weather, a motivational notification, a trigger notification (e.g., a notification based on a current location of the client device), a content notification (e.g., a notification based on current activity by the user on the client device 102 (e.g., a notification based on what the user is currently watching on the client device)), etc. Furthermore, based on the detected event and/or occurrence related to the client device 102, the social networking system 104 can determine a likelihood that the user 110 associated with the client device 102 will be (i.e., is) interested in creating a social media communication.

As shown in step 202 of FIG. 2A, in some embodiments, upon determining that the user would likely be interested in created a social media communication, the social networking system 104 can provide a communication (e.g., a first communication) to the client device 102 for display to a user 110 on the client device 102. In one or more embodiments, the communication can include a prompt to create a social media communication. In some instances, the communication can relate to the social media account associated with the client device 102 (e.g., the user of the client device 102). For instance, the communication can relate to (e.g., describe) the detected activity associated with the social media account associated with the client device 102. For example, the communication can relate to detected messages, posts, events, advertisements, interactions by other users (e.g., likes and/or replies), or any other activity related to the social media account.

In alternative embodiments, as noted above, the communication can relate to any other detected event and/or occurrence related to the client device 102 (e.g., the user of the client device). For example, the communication can relate to a detected location of the client device 102, a proximity of other client devices (e.g., the client device 103 or a gathering of client devices), an event, a reminder, a notification related to geography, a motivational notification, a trigger notification (e.g., a notification based on a current location of the client device), a content notification (e.g., a notification based on current activity by the user on the client device 102), etc. Furthermore, the communication can include a prompt to create a social media communication based on the event and/or occurrence related to the client device 102.

In yet further embodiments, the social networking system 104 can provide a communication (e.g., a first communication) to the client device 102 based on a predetermined schedule. For example, the social networking system 104 can provide a daily/weekly/hourly communication to the client device 102 prompting a user to create a social media communication. Furthermore, as noted above, the daily/weekly/hourly communication can be based on detected activities such as an event and/or occurrence related to the client device 102.

In some embodiments, the communication can include a notification. For example, the communication can include a notification (e.g., a push notification and/or a notification via a notification center) received and displayed via the client device 102 (i.e., the operating system or the social networking application 113 of the client device 102). Furthermore, a prompt may be included within the notification to create a social media communication. Alternatively, the communication can include a message received and displayed via the messaging application 112. For example, the communication can include a low-data message such as, for example, an SMS message. Accordingly, the client device 102 is able to receive the communication despite being in an area with data limitations or otherwise being subject to data restrictions.

In some instances, providing a communication (e.g., a first communication) to the client device 102 for display to a user 110 on the client device 102 (e.g., step 202) can be optional. Specifically, providing a communication to the client device 102 for display to a user 110 on the client device 102 is not required in every embodiment. Rather, as is discussed below, the client device 102 can initiate process 200 by providing a low-data message to the social networking system 104 (e.g., step 208). For example, a user can initiate process 200 by inputting a low-data message into the client device and causing the low-data message to be provided (e.g., sent) to the social networking system 104.

Regardless, in embodiments where a communication is provided, in response to receiving the communication, the messaging application 112 and/or client device 102 displays the communication (e.g., a low-data message or notification), as shown in step 204 of FIG. 2A. For example, as mentioned above, the messaging application 112 of the client device 102 can display the communication as a message within the messaging application 112 (e.g., as a text message). Additionally, in some embodiments, the messaging application 112 of the client device 102 can display the communication as a notification within the messaging application 112. Furthermore, the messaging application 112 of the client device 102 can display the communication via a graphical user interface (e.g., GUI) of the messaging application 112, as discussed in further detail in regard to FIGS. 3A-4C. Alternatively, as noted above, the client device 102 can display the communication (e.g., a notification) via the operating system of the client device 102 (e.g., as a push notification).

In addition to displaying the communication within the messaging application 112, the messaging application 112 and/or client device 102 detects a user interaction inputting a low-data message, as shown in step 206 of FIG. 2A. For example, the messaging application 112 of the client device 102 detects a user interaction inputting a low-data message within the messaging application 112 in response to the prompt. In alternative embodiments, the client device 102 detects a user interaction within a notification interface in response to the prompt. As used herein, the terms "user interaction" mean a single interaction, or combination of interactions, received from a user by way of one or more input devices (e.g., a touch screen display, a keyboard, a mouse, etc.) of the client device 102. Furthermore, the user interaction may include one or more of clicking, tapping, or otherwise selecting elements (e.g., letters and/or characters) to include in the message.

As will be discussed in greater detail below, the social networking system 104 can receive the low-data message and, based on the message, can generate a social media communication (e.g., a post, an event, etc.) to be posted to a social media account of the social networking system 104. Accordingly, in one or more embodiments, the message can include one or more of textual elements. In additional embodiments, the message can include tags indicating other users (e.g., other users of the social networking system 104 and/or friends), locations, activities, image elements, and audio elements to be included in the social media communication.

In further embodiments, the low-data message can include commands for instructing the social networking system 104 on what to perform with the low-data message. For example, the message can include textual commands (e.g., particular words and characters, syntax, etc.) that indicate what type of social media communication (e.g., a post, an event, etc.) to generate and particular additional users (e.g., friends), locations, and/to activities to tag in the social media communication. Furthermore, the commands can include commands to generate a social media communication, to tag a co-user in the social media communication, to tag a geographic location in to the social media object, etc. As non-limiting examples, words and/or characters of the commands can include one or more of "Post," "With," "PM," "Reply," "Comment," "At," "@" "Schedule," "Share," "Tag," "Update," or any other word and/or character. Furthermore, in some embodiments, the command can direct (e.g., instruct) the social networking system 104 to perform an action according to a plain meaning of the command (e.g., as determined by the social networking system 104 using natural language processing). For example, a command "Post," in regard to a message, can direct the social networking system 104 to post the message within an account of the social networking system 104. The elements of the low-data message are described in further detail in regard to FIGS. 3A-3C and 4A-4C.

In additional embodiments, the low-data message can include or be associated with a unique identifier identifying a social media account with which to perform actions (e.g., post social media communications). For example, in some embodiments, the low-data message can include an inputted unique identifier (e.g., a number) (i.e., a unique identifier inputted by the user). In additional embodiments, the unique identifier can include a number (e.g., a telephone number) from which the low-data message originates. Furthermore, the unique identifier can be included in metadata of the low-data message.

In response to the client device 102 detecting a user interaction inputting a low-data message, the social networking system 104 receives the low-data message, as shown in step 208 of FIG. 2A. For instance, in some embodiments, the social networking system 104 can receive the low-data message in response to the prompt included within the original communication (e.g., notification). Furthermore, the social networking system 104 can receive the low-data message from the client device 102 and/or messaging application 112 of the client device 102 via a network (e.g., a cellular network). In other words, upon detecting a user interaction inputting a low-data message, the client device 102 and/or messaging application 112 of the client device 102 can provide the low-data message to the social networking system 104. For example, the social networking system 104 can have a routing number (e.g., a telephone number) to which the client device 102 can send the low-data message. As an illustration, the user 110 can use the client device 102 to send an SMS message to the social networking system 104.

Upon receiving the low-data message, the social networking system 104 analyzes the low-data message, as shown in step 210 of FIG. 2A. For example, the social networking system 104 can analyze the low-data message to identify content from the low-data message. In some embodiments, the social networking system 104 can analyze the low-data message to determine a meaning of the identified content of the low-data message. In additional embodiments, the social networking system 104 can analyze the low-data message to determine whether the identified content of the low-data message includes specific commands. In further embodiments, the social networking system 104 can analyze the low-data message to determine a social media account associated with the low-data message and/or client device 102. Each of the foregoing examples is described in further detail below.

As mentioned briefly above, in some embodiments, the social networking system 104 can analyze the message to determine a meaning of the identified content of the low-data message. In particular, the social networking system 104 can include a natural language processing ("NLP") system for processing and deriving meaning from human and/or natural language input (e.g., the low-data message). For example, the social networking system 104 can include any NLP system known in the art. Accordingly, the social networking system 104 can analyze the low-data message via the NLP system to determine and derive meanings of the identified content of the low-data.

As a few non-limiting examples, in some embodiments, the social networking system 104 can analyze the identified content of the low-data message to determine a status of the user (e.g., a user of the client device), activities described in the low-data message (e.g., eating at a restaurant), additional users (e.g., friends of the user within the social networking system 104) identified in the low-data message, locations identified in the low-data message, etc. For example, the social networking system 104 can utilize the NLP system to determine meanings of the identified content of the low-data message received from the client device 102, and from the meanings of the identified content of the low-data message, the social networking system 104 can determine a status of the user, activities, additional users, and locations identified in the identified content of the low-data message.

As noted above, in some embodiments, the social networking system 104 can analyze the low-data message to determine whether the identified content of the low-data message includes specific commands. For example, the social networking system 104 can perform a keyword and key character analysis on the identified content of the low-data message to determine whether the low-data message includes specific keywords and/or key characters. For instance, the social networking system 104 can analyze the identified content of the low-data message to determine whether the low-data message includes any of the words and/or described above in regard to step 206 of FIG. 2A. Furthermore, as is discussed in greater detail below, the social networking system 104 can utilize the commands to determine a type of social media communication to generate the social media communication using the identified content.

In addition to determining whether the low-data message includes specific commands, as mentioned above, the social networking system 104 can analyze the low-data message to determine a social media account associated with the low-data message. For instance, the social networking system 104 can analyze the low-data message to identify a unique identifier included with the message (e.g., the unique identifier described above in regard to step 206 of FIG. 2A). In some embodiments, the social networking system 104 can identify a unique identifier included in the body of the low-data message (e.g., a unique identifier inputted by a user). In additional embodiments, the social networking system 104 can analyze the low-data message (e.g., analyze metadata of the message) to determine a unique identifier (e.g., telephone number) from which the low-data message originated. Furthermore, the social networking system 104 can query a unique identifier database to determine a social media account associated with the unique identifier.

Furthermore, the social networking system 104 can analyze a low-data message to determine a suitable method to communicate with the client device 102. For example, the social networking system 104 can analyze the low-data message to determine a type (e.g., SMS, EMS, MMS, etc.) of the low-data message, and based on the type of the low-data message, can determine (e.g., conclude) to communicate with the client device 102 via a same type of message. In further embodiments, the social networking system 104 can analyze the low-data message to determine (e.g., identify) any attached image, video, and/or audio elements.

In addition to analyzing the message, the social networking system 104, in some embodiments, generates a proofing message (e.g., a verification message) to provide to the client device 102, as shown in step 212 of FIG. 2A. For instance, based on the analysis performed on the low-data message, the social networking system 104 can generate a proofing message to provide to the client device 102 indicating a type of social media communication to be generated and a content of the social media communication. For example, the social networking system 104 can include a natural language generation ("NLG") system for generating and/or customizing communications (e.g., proofing messages, notifications, etc.) to provide to the client device 102 in response to receiving the low-data message. In other words, the social networking system 104 can generate natural language messages from a machine representation system such as a knowledge base and/or a logical form.

In particular, the social networking system 104 can generate the proofing message to allow a user (e.g., a user of the client device 102) to proof (e.g., determine an accuracy of) a social media communication to be generated before actually causing (via the client device 102) the social networking system 104 to generate the social media communication and add it to a social media account. As a non-limiting example, if the low-data message received by the social networking system 104 identifies (e.g., identified via text of the message) an additional user (e.g., a friend of the user), an activity, and a location and a command to post a social media communication, the proofing message can include the following text "Post: [The activity] with [the another user] at [the location]? Reply Yes or No". Additionally, the social networking system 104 can generate the proofing message according to the determined suitable method of communicating with the client device 102 described above in regard to step 210.

Furthermore, upon generating the proofing message, the social networking system 104 provides the proofing message to the client device 102 for display to the user, as shown in step 214 of FIG. 2A. In some embodiments, the social networking system 104 can provide the proofing message to the client device 102 and/or messaging application 112 of the client device 102 via a network (e.g., a cellular network).

In response to receiving the proofing message, the client device 102 displays the proofing message, as shown in step 216 of FIG. 2A. For example, as mentioned above, the messaging application 112 of the client device 102 can display the proofing message within the messaging application 112 (e.g., as a text message). Furthermore, the messaging application 112 of the client device 102 can display the proofing message via the graphical user interface (e.g., GUI) of the messaging application 112, as is discussed in further detail in regard to FIGS. 3A-4C.

In addition to displaying the proofing message within the messaging application 112, the messaging application 112 and/or client device 102 detects a user interaction inputting a confirmation message (e.g., responding to the proofing message), as shown in step 218 of FIG. 2A. For example, the messaging application 112 of the client device 102 detects, within the messaging application 112, a user interaction inputting a confirmation (e.g., a text such as "Yes" or "No") as to whether or not to perform the action described in the proofing message (e.g., post a message on a wall of the user). Furthermore, the confirmation message can include a low-data message as described above.

In response to the client device 102 detecting a user interaction inputting a confirmation message, the social networking system 104 receives the confirmation message, as shown in step 220 of FIG. 2A. For example, the social networking system 104 can receive the confirmation message from the client device 102 and/or messaging application 112 of the client device 102 via a network (e.g., a cellular network). In other words, upon detecting a user interaction inputting a confirmation message, the client device 102 and/or messaging application 112 of the client device 102 can provide the confirmation message to the social networking system 104.

In some instances, generating the proofing message, providing the proofing message, and receiving a confirmation message from the client device 102 (e.g., steps 212-220) can be optional. Specifically, generating the proofing message, providing the proofing message, and receiving a confirmation message from the client device 102 are not required in every embodiment. Rather, as is discussed below, the social networking system 104 can, in some embodiments, merely generate a social media communication in response to receiving the low-data message.

In embodiments including generating a proofing message and receiving a confirmation message, upon receiving the confirmation message, the social networking system 104 determines whether or not the confirmation message indicates to proceed in generating the social media communication described in the proofing message. Specifically, the social networking system 104 utilizes the NLP system to determine a meaning of the confirmation message and, based on the meaning of the confirmation message, the social networking system 104 determines whether to proceed in generating the social media communication described in the proofing message. For example, the social networking system 104 determines whether the confirmation message includes a positive or negative indication (e.g., a "Yes" or a "No"). If the social networking system 104 determines that the confirmation message includes a positive indication (e.g., "Yes"), the social networking system 104 generates the social media communication, as discussed below. If, on the other hand, the social networking system 104 determines that the confirmation message includes a negative indication, the social networking system 104 does not proceed in generating the social media communication.

As discussed above, either in response to receiving the low-data message or receiving a confirmation message, the social networking system 104 generates a social media communication using the identified content from the low-data message, as shown in step 222 of FIG. 2A. Furthermore, the social networking system 104 generates the social media communication according to the analysis performed by the social networking system 104 on the low-data message (e.g., the analysis performed in step 210 of FIG. 2A). In some embodiments, the social networking system 104 generates the social media communication according to a determined meaning of the identified content of the low-data message. In one or more embodiments, the social networking system 104 generates the social media communication according to specific commands included in the identified content of the low-data message. In further embodiments, the social networking system 104 generates the social media communication according to a combination of the foregoing examples. Additionally, the social networking system 104 generates the social media communication according to the determined social media account associated with the low-data message.

As noted above, in some embodiments, the social networking system 104 generates a content of the social media communication according to a determined meaning of the identified content of the low-data message. For example, based on a meaning of the identified content of the low-data message derived by the NLP system, the social networking system 104 can generate the content the social media communication to reflect the meaning of the low-data message. For instance, as discussed above in regard to step 210 of FIG. 2A, utilizing the NLP system, the social networking system 104 may determine a status, an activity, an additional user (e.g., a friend), and/or a location indicated in the identified content of the low-data message, and the social networking system 104 can generate a content of the social media communication to relate to (e.g., describe, mention, etc.) the determined status, activity, an additional user, and/or location. Furthermore, in some embodiments, based on the determined meaning of the identified content of the low-data message, the social networking system 104 can tag the status, activity, an additional user, and/or location within the content of the social media communication.

In one or more embodiments, the social networking system 104 can generate a particular type of social media communication based on the determined meaning of the identified content of the low-data message. For example, if the identified content of the low-data message is directed (e.g., addressed) to a particular additional user of the social networking system 104, the social networking system 104 can, in some embodiments, generate a social networking message (e.g., a private message) to the other user. On the other hand, if the identified content of the low-data message is directed to a status update, an activity experienced by the user (e.g., the user of the client device 102), or a location visited by the user, the social networking system 104 can, in some embodiments, generate a social networking post (e.g., a post to be added to a timeline) identifying (e.g., mentioning) the activity and/or location. In alternative embodiments, the social networking system 104 can always generate a particular type of social media communication regardless of a determined meaning. For example, in some embodiments, the social networking system 104 can always generate a post related to the identified content of the low-data message.

As some non-limiting examples, based on the analysis performed on the low-data message, the social networking system 104 can generate one or more of a post (e.g., a wall post), an event, an advertisement, a message (e.g., private message), a notification, or any other suitable object for displaying within a social networking system 104.

As noted above, in some instances, the social networking system 104 generates the content and the type of the social media communication according to specific commands included in the identified content of the low-data message. For example, as noted above, in some embodiments, the identified content of the low-data message can include specific commands (e.g., "Post:") such as the specific commands described above in regard to step 206. Furthermore, based on the specific commands, the social networking system 104 can generate the content and the type of social media communication. As a non-limiting example, if the identified content of the low-data message includes the following text message: (Post: "Eating excellent seafood" With: "Kyle" @: "Tim's Sushi"), the social networking system 104 can generate a post reciting "Eating excellent seafood" while tagging the other user "Kyle" and the location "Tim's Sushi".

Moreover, as briefly discussed above, the social networking system 104 can generate the social media communication according to a combination of the foregoing examples. For instance, the social networking system 104 can generate the type of social media communication based on specific commands included in the identified content of the low-data message and can generate the content of the social media communication according to a determined meaning of the identified content of the low-data message. As an additional example, the social networking system 104 can generate the content of social media communication based on specific commands included in the identified content of the low-data message and can generate the type of the social media communication according to a determined meaning of the identified content of the low-data message.

Additionally, as mentioned briefly above, the social networking system 104 generates the social media communication according to the determined social media account associated with the low-data message and/or client device 102. For example, based on the determined social media account, as discussed above in regard to step 210 of FIG. 2A, the social networking system 104 can generate the social media communication as if the social media communication were created (e.g., designed) by the user associated with the social media account. In other words, the social networking system 104 can generate the social media communication as if the social media communication originated from the user's social media account.

Upon generating the social media communication, the social networking system 104 provides the social media communication to a co-user of the social networking system (e.g., the co-user 111 of the additional client device 103), as shown in step 224 of FIG. 2B. For instance, the social networking system 104 can add the social media communication to a social media account associated with the low-data message. For example, based on the generated type of social media communication, the social networking system 104 can add the social media communication to the determined social media account. For example, if the social media communication includes a post, the social networking system 104 can add the post to the social media account's timeline and/or wall. If, on the other hand, the social media communication includes a message to a particular additional user, the social networking system 104 can add the message to a communication thread (e.g., a messenger) between the additional user and the social media account (e.g., the user's account). Furthermore, upon adding the social media communication to the determined social media account, the social networking system provides the social media communication to the co-user 111 via, for example, the social networking application 113 of the client device 103 (e.g., via a newsfeed of the co-user 111).

Additionally, upon providing the social media communication to a co-user of the social networking system, the social networking system 104 can detect a user interaction by the co-user of the social networking system 104 the social media communication, as shown in step 226 of FIG. 2B. In some embodiments, the social networking system 104 can detect a co-user interaction with a selectable element of the social media communication (e.g., a "like" or "share" button). In one or more embodiments, the social networking system 104 can detect a co-user interaction inputting a reply message (e.g., a comment) associated with the social media communication.

Upon detecting a user interaction by the co-user of the social networking system 104 with the social media communication, the social networking system 104 generates a second low-data message to notify the user of the detected user interaction with the social media communication, as shown in step 228 of FIG. 2B. In particular, the social networking system 104 can generate the second low-data message to describe the user interaction. For example, the social networking system 104 can utilize the NLG system to generate the second low-data message describing the user interaction. For instance, if the user interaction includes a comment on (e.g., a reply to) the social media communication, the social networking system 104 can generate the second low-data message to include any text of the comment and can indicate that the additional user commented on the social media communication. Furthermore, the social networking system 104 can generate the second low-data message according to the determined suitable method of communicating with the client device 102 (e.g., the suitable method of communicating determined in step 210 of FIG. 2A). For example, the social networking system 104 can generate the second low-data message as an SMS message. Additionally, the social networking system 104 can generated the second low-data to include a low-data message.

Although the second low-data message is described herein as being generated in response to a user interaction with a social media communication generated in response to a low-data message, the disclosure is not so limited. For example, in some embodiments, the second low-data message can relate to social media communications generated directly via a social networking system 104 application, a social networking website, or any other method of causing social media communications to be generated. Furthermore, instead of generating a second low-data message, the social networking system 104 can generate an additional notification describing the user interaction with the social media communication and notifying the user of the detected user interaction with the social media communication. Furthermore, the notification can include an additional prompt to create a second social media communication (e.g., a reply).

In addition to generating the second low-data message, the social networking system 104 provides (e.g., sends) the second low-data message to the client device 102, as shown in step 230 of FIG. 2B. In some embodiments, the social networking system 104 can send the second low-data message to the client device 102 and/or messaging application 112 of the client device 102 via a network (e.g., a cellular network).

In response to receiving the second low-data message, the client device 102 displays the second low-data message, as shown in step 232 of FIG. 2B. For example, the messaging application 112 of the client device 102 can display the second low-data message within the messaging application 112 (e.g., as a text message) of the client device 102 to be displayed to a user. Furthermore, the messaging application 112 of the client device 102 can display the second low-data via the graphical user interface (e.g., GUI) of the messaging application 112, as is discussed in further detail in regard to FIGS. 3A-4C.

In addition to displaying the second low-data message within the messaging application 112, the messaging application 112 and/or client device 102 detects a user interaction inputting a third low-data message including a response (e.g., responding to the second low-data message), as shown in step 234 of FIG. 2B. Furthermore, the third low-data message can include a low-data message as described above.

In response to the client device 102 detecting a user interaction inputting a third low-data message, the social networking system 104 receives the third low-data message, as shown in step 236 of FIG. 2B. For example, the social networking system 104 can receive the third low-data message from the client device 102 and/or messaging application 112 of the client device 102 via a network (e.g., a cellular network). In other words, upon detecting a user interaction inputting a third low-data message, the client device 102 and/or messaging application 112 of the client device 102 can provide the third low-data message to the social networking system 104.

Upon receiving the third low-data message, the social networking system 104 analyzes the third low-data message, as shown in step 238 of FIG. 2B. In some embodiments, the social networking system 104 can analyze the third low-data message to determine a meaning of the third low-data message. In additional embodiments, the social networking system 104 can analyze the third low-data message to determine whether the third low-data message includes specific commands. For example, with regard to the third low-data message, the social networking system 104 can perform any of the analysis described above in regard to step 210 of FIG. 2A.

In addition to analyzing the message, the social networking system 104, in some embodiments, generates an additional proofing message (e.g., a verification message) to provide to the client device 102, as shown in step 240 of FIG. 2C. For instance, based on the analysis performed on the message, the social networking system 104 can generate an additional proofing message to the client device 102 indicating a type of social media communication to be generated and a content of the social media communication. For example, the social networking system 104 can utilize the NLG system to generate the additional proofing message. In particular, the social networking system 104 can generate the additional proofing message according to any of the manners described above in regard to step 212 of FIG. 2A.

Upon generating the additional proofing message, the social networking system 104 provides the additional proofing message to the client device 102 for display to the user, as shown in step 242 of FIG. 2C. In some embodiments, the social networking system 104 can provide the additional proofing message to the client device 102 and/or messaging application 112 of the client device 102 via a network (e.g., a cellular network).

In response to receiving the additional proofing message, the client device 102 displays the additional proofing message, as shown in step 244 of FIG. 2C. For example, the messaging application 112 of the client device 102 can display the additional proofing message within the messaging application 112 (e.g., as a text message). Furthermore, the messaging application 112 of the client device 102 can display the additional proofing message via the graphical user interface (e.g., GUI) of the messaging application 112, as is discussed in further detail in regard to FIGS. 3A-4C.

In addition to displaying the additional proofing message within the messaging application 112, the messaging application 112 and/or client device 102 detects a user interaction inputting an additional confirmation message (e.g., responding to the additional proofing message), as shown in step 246 of FIG. 2C. For example, the messaging application 112 of the client device 102 detects, within the messaging application 112, a user interaction inputting an additional confirmation (e.g., a text such as "Yes" or "No") as to whether or not to perform the action described in the additional proofing message (e.g., post a message on a wall of the user). Furthermore, the additional confirmation message can include a low-data message as described above.

In response to the client device 102 detecting a user interaction inputting an additional confirmation message, the social networking system 104 receives the additional confirmation message, as shown in step 248 of FIG. 2C. For example, the social networking system 104 can receive the additional confirmation message from the client device 102 and/or messaging application 112 of the client device 102 via a network (e.g., a cellular network). In other words, upon detecting a user interaction inputting an additional confirmation message, the client device 102 and/or messaging application 112 of the client device 102 can provide the additional confirmation message to the social networking system 104.

In some instances, generating the additional proofing message, providing the additional proofing message, and receiving an additional confirmation message from the client device 102 (e.g., steps 240-248) can be optional. Specifically, generating the additional proofing message, providing the additional proofing message, and receiving an additional confirmation message from the client device 102 are not required in every embodiment. Rather, as is discussed below, the social networking system 104 can, in some embodiments, merely generate a second social media communication in response to receiving the third low-data message.

In embodiments including generating an additional proofing message and receiving an additional confirmation message, upon receiving the additional confirmation message, the social networking system 104 determines whether or not the additional confirmation message indicates to proceed in generating the second social media communication described in the proofing message. Specifically, the social networking system 104 utilizes the NLP system to determine a meaning of the additional confirmation message and based on the meaning of the additional confirmation message, the social networking system 104 determines whether to proceed in generating the second social media communication described in the additional proofing message. For example, the social networking system 104 determines whether the additional confirmation message includes a positive or negative indication (e.g., a "Yes" or a "No"). If the social networking system 104 determines that the additional confirmation message includes a positive indication (e.g., "Yes"), the social networking system 104 generates the second social media communication, as discussed below. If, on the other hand, the social networking system 104 determines that the additional confirmation message includes a negative indication, the social networking system 104 does not proceed in generating the second social media communication.

As discussed above, either in response to receiving the third low-data message or receiving an additional confirmation message, the social networking system 104 generates a second social media communication, as shown in step 250 of FIG. 2C. Furthermore, the social networking system 104 generates the second social media communication according to the analysis performed by the social networking system 104 on the third low-data message (e.g., the analysis performed in step 238 of FIG. 2B). In some embodiments, the social networking system 104 generates the second social media communication according to a determined meaning of the third low-data message. In one or more embodiments, the social networking system 104 generates the second social media communication according to specific commands included in the third low-data message. For example, the social networking system 104 can generate the second social media communication according to any of the manners described above in regard to step 222 of FIG. 2A.

Upon generating the second social media communication, the social networking system 104 provides the second social media communication to the co-user of the social networking system (e.g., the co-user 111 of the additional client device 103), as shown in step 252 of FIG. 2C. For instance, the social networking system 104 adds the second social media communication to the social media account associated with the low-data message and associates the second social media communication with the social media communication (i.e., the original social media communication). For example, if the second social media communication includes a reply comment, the social networking system 104 can add the reply comment to (e.g., associate the reply comment with) the original social media communication and in reply to the detected user interaction (e.g., the user interaction detected in step 226 of FIG. 2A). Furthermore, upon adding the second social media communication to the determined social media account, the social networking system provides the second social media communication to the co-user 111 via the social networking application 113 of the client device 103 (e.g., via a newsfeed of the co-user 111).

Additionally, the social networking system 104 can repeat the actions described in steps 226-252 with regard to the original social media communication and/or the second social media communication. For example, if the social networking system 104 detects user interactions with one or more of the original social media communication and/or the second social media communication, the social networking system 104 can perform the actions described in regard to steps 226-252 of FIGS. 2B and 2C.

Furthermore, referring to FIGS. 2A-2C together, although the social networking system 104 is described herein as generating social media communications in response to receiving low-data messages, the disclosure is not so limited. For example, in some embodiments, the social networking system 104 can update a user profile (e.g., his or her name, profile picture, city of residence, contact information, birth date, gender, marital status, family status, employment, educational background, preferences, interests, and other demographic information) in response to receiving a low-data message instructing the social networking system 104 to update the user's profile (e.g., instructing the social networking system 104 to update the user's profile via a meaning and/or specific commands of the low-data message).

Figure 3A:
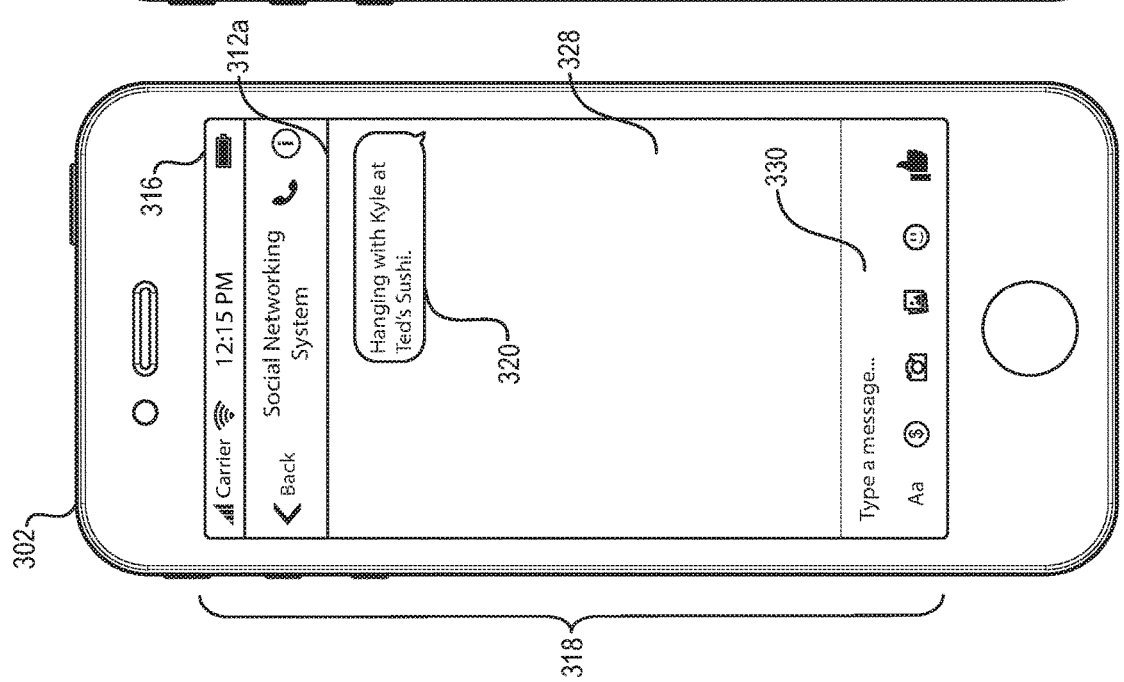
FIGS. 3A-3C illustrate a flow of user interfaces including features of the communication system in accordance with one or more embodiments.
Figure 3B:
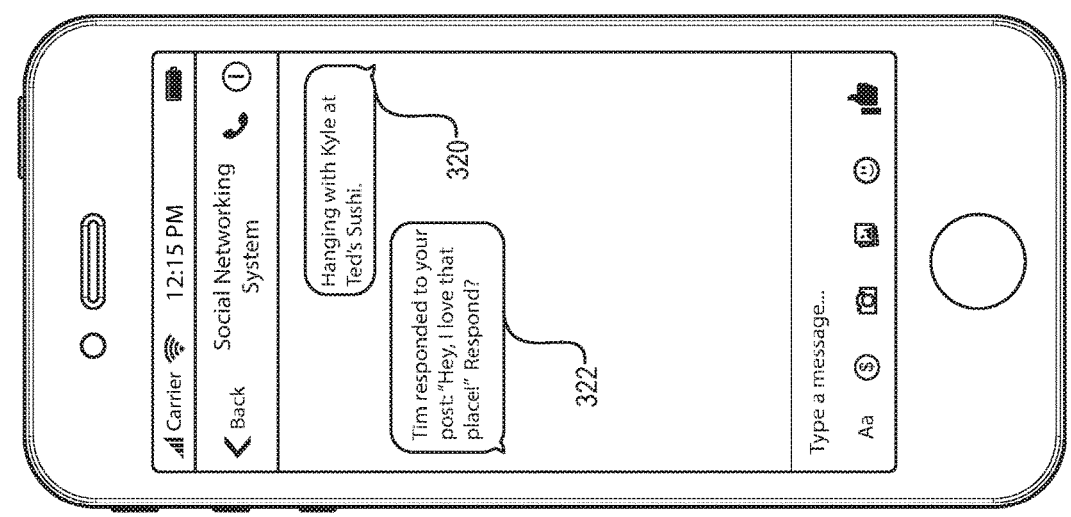
Figure 3C:
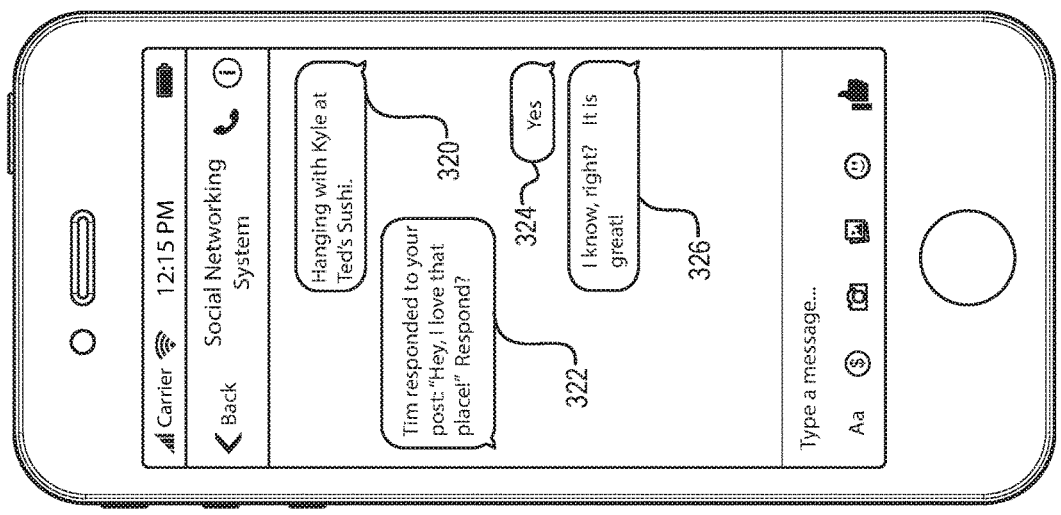

FIGS. 3A-3C illustrate a flow of user interfaces including features of the communication system 100 according to an embodiment of the present disclosure. As will be described in more detail below, the components of the communication system 100 as described in regard to FIGS. 1-2C can provide, alone and/or in combination with the other components, one or more graphical user interfaces ("GUIs"). In particular, the components can allow a user 110 to interact with a collection of display elements for a variety of purposes. In particular, FIGS. 3A-3C and the description that follows illustrate various example embodiments of the user interfaces and features that are in accordance with one or more embodiments of the present disclosure.

For example, FIG. 3A illustrates a client device 302 of a social networking system user (e.g., the user 110 of FIG. 1) that may implement one or more of the components or features of the communication system 100. As shown in FIG. 3A, in some embodiments, the client device 302 is a handheld device, such as a mobile phone device (e.g., a smartphone). As used herein, the term "handheld device" refers to a device sized and configured to be held/operated in a single hand of the user 110. In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

The client device 302 includes a touch screen display 316 that can display user interfaces. Furthermore, the client device 302 receives and/or detects user input via the touch screen display 316. As used herein, a "touch screen display" refers to the display of a touch screen device. In one or more embodiments, a touch screen device may be the client device 302 with at least one surface upon which a user 110 may perform touch gestures (e.g., a laptop, a tablet computer, a personal digital assistant, a media player, a mobile phone, etc.). Additionally or alternatively, the client device 302 may include any other suitable input device, such as a touch pad or those described below with reference to FIG. 7.

FIGS. 3A-3C show example messages (e.g., low data messages) having natural language (e.g., without specific commands). As shown in FIG. 3A, the touch screen display 316 of the client device 302 displays a messaging application GUI 312a. The messaging application GUI 312a displays a communication thread GUI 318 showing communications (e.g., messages) between the client device 302 and the social networking system 104. Furthermore, the communication thread GUI 318a can include a common window 328 for displaying messages from both of the user and the social networking system 104. Moreover, the communication thread GUI 318 can include an input area 330 for adding messages to the common window 328. The communication thread GUI 318 can further include a plurality of selectable elements for sending communications from the user and for closing the communication thread GUI 318.

As noted above, FIGS. 3A-3C show example messages (e.g., low data messages) having natural language (e.g., a language as a user may naturally use when writing a message to entity). For example, referring to FIG. 3A, the client device 302 detects a user interaction inputting a low-data message 320 into the input area 330 of the communication thread GUI 318 of the message application GUI 312a, and the client device 302 adds the low-data message 320 to the communication thread GUI 318 (e.g., to the common window 328 of the communication thread GUI 318) of the messaging application GUI 312a. Moreover, the low-data message 320 can include any of the elements of a low-data message described above in regard to step 206 of FIG. 2A.

In addition to adding the low-data message 320 to the communication thread GUI 318 of the messaging application GUI 312a, the client device 302 can provide (e.g., send) the low-data message 320 to the social networking system 104. For example, the client device 302 can provide the low-data message 320 to the social networking system 104 in any of the manners described above in regard to step 208 of FIG. 2A. Furthermore, as described above in regard in regard to steps 222 through 228 of FIGS. 2A-2B, the social networking system 104 can generate a social media communication, add the social media communication to a social media account associated and/or identified in the low-data message, and detect user interactions from additional users (e.g., friends) within the social networking system 104. Additionally, based on the detected user interactions, the social networking system 104 generates a low-data message describing the user interactions and provides the low-data message to the client device 302. For example, the social networking system 104 can generate a second low-data message to notify the user of the detected user interaction and provide the second low-data message to the client device 302 according to any of the manners described above in regard to steps 228 and 230 of FIG. 2B.

Referring to FIGS. 3B and 3C, in response to receiving the second low-data message 322 from the social networking system 104, the client device 302 adds the second low-data message 322 to the communication thread GUI 318 of the messaging application GUI 312a for display to a user. As shown, the second low-data message can describe the detected user interaction with the social media communication (e.g., describe a reply to a post). Furthermore, as illustrated, in some embodiments, the second low-data message 322 may provide an option of responding to the second low-data message (e.g., text "Respond?"). Upon adding the second low-data message 322 to the communication thread GUI 318 of the messaging application GUI 312a, the client device 302 can detect one or more user interactions inputting a third low-data message to the second low-data message 322. For instance, the client device 302 and/or messaging application 112 can first detect one or more user interactions responding to the option of responding to the second low-data message. In particular, the client device 302 can detect a user interaction inputting an initial response 324 "YES" or "NO" to indicate whether or not to respond to the second low-data message (e.g., respond to the detected user interaction with the social media communication). Secondly, if the initial response 324 included "YES," the client device 302 can detect a user interaction inputting a third low-data message 326.

Additionally, the client device 302 adds the third low-data message 326 to the communication thread GUI 318 (e.g., to the common window 328 of the communication thread GUI 318) of the messaging application GUI 312a. Furthermore, as shown in FIG. 3C, in some embodiments, the third low-data message 326 can include natural language. In some instances, the third low-data message 326 can include any of the elements of the third low-data message described above in regard to steps 234 and 236 of FIG. 2A. Moreover, the client device 302 can provide the third low-data message 326 to the social networking system 104. For example, the client device 302 can provide the third low-data message 326 to the social networking system 104 in any of the manners described above in regard to step 236 of FIG. 2B.

As discussed above in regard to steps 238-252, upon receiving the third low-data message 326, the social networking system 104 can generate a second social media communication and can add the second social media communication to the social media account associated with the third low-data message and/or client device 302.

FIGS. 4A-4C illustrate a flow of user interfaces including features of the communication system 100 according to another embodiment of the present disclosure. The flow of user interfaces is similar to the flow of user interfaces described above in regard to FIGS. 3A-3C; however, FIGS. 4A-4C illustrate a low-data message and a third low-data message including specific commands.

FIG. 4A illustrates an example low-data message 420 inputted by a user. As shown, the low-data message 420 can include one or more specific commands. For example, the low-data message 420 can include any of the commands described above in regard to step 206 of FIG. 2A. Furthermore, the commands can provide instructions to the social networking system 104. For instance, the command "Post:" can instruct the social networking system 104 to generate a post including a following statement. Furthermore, the command "With:" can instruct the social networking system 104 to tag a following indicated user. Moreover, the command "@" can instruct the social networking system 104 to tag a following indicated location.

FIG. 4B illustrates a plurality of second low-data messages 422a, 422b, which describe detected user interactions with a social media communication resulting from the low-data message, such as a second low-data message as described above in regard to step 230 of FIG. 2B. As shown, the second low-data messages 422a, 422b can include natural language. Furthermore, an original second low-data message 422a can describe a first detected user interaction (e.g., an interaction by a first additional user), and an additional second low-data message 422b can describe a second detected user interaction (e.g., an interaction by a second different additional user).

FIG. 4C illustrates an example a third low-data message 426 inputted by a user. As shown, the third low-data message 426 can include one or more specific commands. For example, the third low-data message 426 can include any of the commands described above in regard to step 206 of FIG. 2A. Furthermore, the commands can provide instructions to the social networking system 104. For instance, the command "Reply:" can instruct the social networking system 104 to reply to a following additional user's interaction. For example, "Reply: (Sam)" can instruct the social networking system 104 to reply to a user interaction by the user, Sam. Moreover, the command "Post:" can instruct the social networking system 104 to post a following statement in reply to the user interaction by the additional user.

Allowing users to provide messages including specific commands may be advantageous. For example, because the social networking system 104 enables users to include specific commands in a message, the social networking system 104 enables the user to specify to which additional user to respond. Furthermore, because the social networking system 104 enables users to include specific commands in a message, the social networking system 104 of the current disclosure enables users to respond to earlier received low-data messages that may not be the most recent low-data message. Furthermore, because the social networking system 104 enables users to include specific commands in a message, the social networking system 104 of the current disclosure enables a user to pick and choose to which low-data messages to respond. Moreover, because the social networking system 104 enables users to include specific commands in a message, the social networking system 104 removes any necessity to provide and/or require an option to respond because the option to respond is provided through the specific commands. Additionally, because the social networking system 104 enables users to include specific commands in a message, the social networking system 104 of the current disclosure enables a user to avoid responding to additional low-data messages and enables the user to merely continue posting new social media communications without responding to the additional low-data messages (e.g. the second low-data message).

Figure 5:
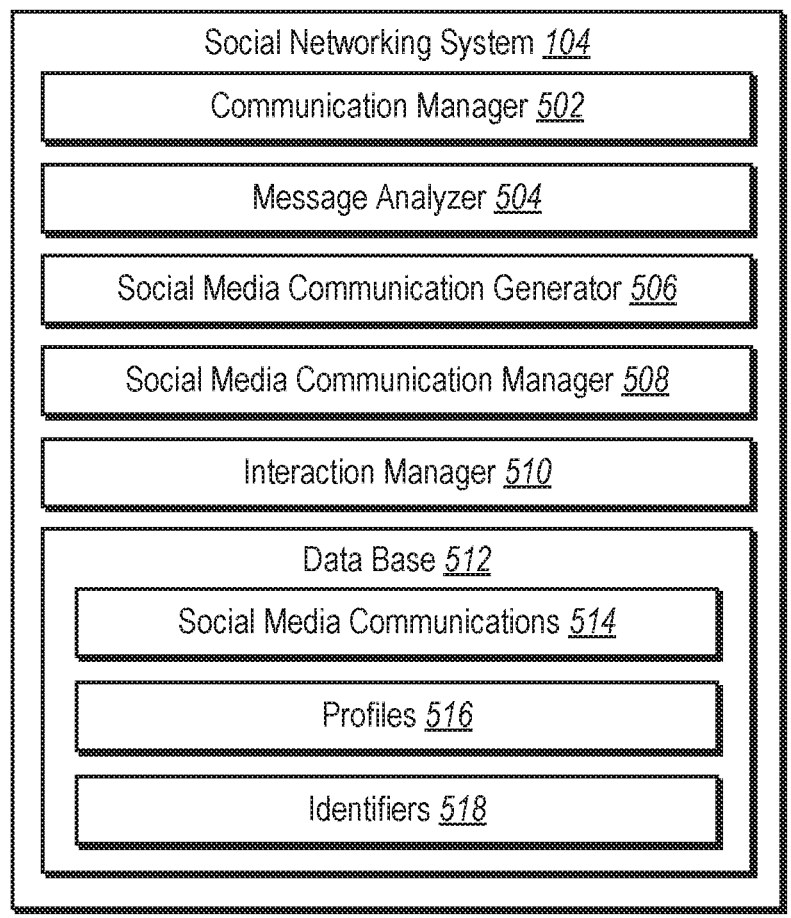
FIG. 5 illustrates a schematic diagram of a social networking system according to an embodiment of the present disclosure.

FIG. 5 illustrates a detailed schematic diagram of a social networking system 104 in accordance with one or more embodiments. The social networking system 104 can be implemented using a computing device including at least one processor executing instructions that cause the communication system 100 to perform the processes described herein. In some embodiments, the social networking system 104 can be implemented by a single server device, or across multiple server devices. Additionally or alternatively, a combination of one or more server devices and one or more client devices can implement the social networking system 104. Furthermore, in one embodiment, the social networking system 104 can comprise hardware, such as a special-purpose processing device to perform a certain function. Additionally or alternatively, the social networking system 104 can comprise a combination of computer-executable instructions and hardware.

In some embodiments, the social networking system 104 may include a communication manager 502, a message analyzer 504, a social media communication generator 506, a social media communication manager 508, an interaction manager 510, and a database 512. The communication manager 114 manages all communication between the social networking system 104 and client devices 102. For example, the communication manager 114 receives low-data messages, confirmations messages, and additional low data messages (e.g., the third low-data message and/or response messages) from a client device 102. Specifically, the communication manager 114 can received low-data messages, confirmations messages, and additional low data messages (e.g., the third low-data message and/or response messages) from a client device 102 in any of the manners described above in regard to steps 208, 220, 236, and 248 of FIGS. 2A-2C. Furthermore, the communication manager 114 provides (e.g., sends) communications, proofing messages, and notifying message (e.g., the second low-data message) to the client device 102. For instance, the communication manager 502 can provide communications, proofing messages, and notifying messages to the client device 102 in any of the manners described above in regard to steps 202, 214, 230, and 242 of FIGS. 2A-2C.

After receiving a low-data message and/or response message from the client device (e.g., client device 102), the message analyzer 504 can analyze the low-data message and/or response message. For example, the message analyzer 504 can analyze the low-data message and/or response message in any of the manners described in regard to steps 210 and 238 of FIGS. 2A and 2B.

The social media communication generator 506 can generate social media communication and second social media communication (e.g., response social media communications) according to the analysis performed by the message analyzer 504. For example, the social media communication generator 506 can generate one or more of a post (e.g., a wall post), an event, an advertisement, a message (e.g., private message), a notification, or any other suitable object for displaying within the social networking system 104. For instance, the social media communication generator 506 can generate social media communication and second social media communication according to any of the manners described in regard to steps 222 and 250 of FIGS. 2A and 2C.

The social media communication manager 508 adds the social media communication and second social media communication generated by the social media communication generator 506 to a social media account. For example, based on the generated type of social media communication, the social media communication manager 508 can add the social media communication to a determined social media account. For instance, if the social media communication includes a post, the social media communication manager 508 can add the post the social media account's timeline and/or wall. If, on the other hand, the social media communication includes a message to a particular additional user, the social media communication manager 508 can add the message to a communication thread between the additional user and the social media account. For example, the social media communication manager 508 can add the social media communication and/or second social media communication to social media accounts in any of the manners described above in regard to steps 224 and 252 of FIGS. 2B and 2C.

The interaction manager 510 detects user interactions (e.g., added comments, likes, shares, etc.) with the social media communication and/or second social media communication added to a social media account by the social media communication manager 508. For example, the interaction manager 510 can detect user interactions with the social media communication and/or second social media communication in any of the manners described above in regard to step 226 of FIG. 2B.

Figure 6:
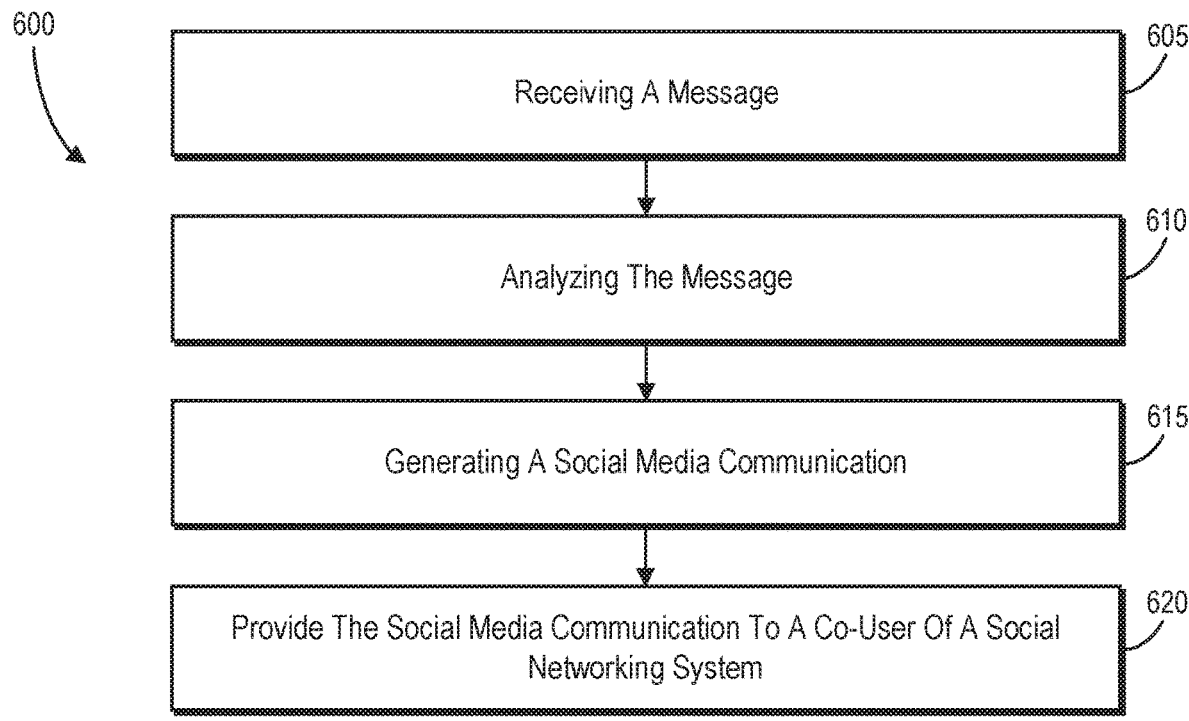
FIG. 6 shows a method flow of facilitating communications between a client device and a social networking system according to an embodiment of the present disclosure.

Furthermore, as mentioned above, and as illustrated in FIG. 5, the social networking system 104 also includes a database 512. As shown, the database 512 includes social media communications 514, profiles 516, and identifiers 518. In one or more embodiments, the social media communications 514 are representative of social media communication information, such as described herein. Similarly, in one or more embodiments, the profiles 516 are representative of profile information, such as described herein. In some embodiments, the identifiers 518 are representative of unique identifier information, such as described herein FIG. 6 illustrates a flowchart of one example method 600 of providing a social media communication (e.g., a post) to a co-user by sending a low-data message (e.g., a text message) to a social networking system 104. As shown in FIG. 6, the method 600 can involve an act 605 of receiving a message from a client device (e.g., a user of a client device 102). For example, act 605 can include receiving, at a social networking system, a low-data message from a client device associated with a user of the social networking system. In some instance act 605 can include receiving a short message service text message from the client device. Furthermore, in some embodiments, act 605 can include receiving the low-data message from the client device and/or messaging application of the client device via a network (e.g., a cellular network). Additionally, act 605 can include any of the actions described above in regard to step 208 of FIG. 2A.

Additionally, the method 600 involves an act 610 of analyzing the message. In particular, act 610 can include analyzing the low-data message with a social networking system 104. For instance, act 610 can include analyzing the low-data message to identify content from the low-data message to include in a social media communication. In some embodiments, act 610 can include identifying one or more commands for the social media communication. In one or more embodiments, the one or more commands include at least one of a command to generate the social media communication, a command to tag a co-user in the social media communication, or a command to tag a geographic location in the social media communication. In additional embodiments, act 610 can include determining a meaning of the low-data message. Furthermore, act 610 can include determining a social media account associated with the low-data message and/or client device. Also, act 610 can include identifying a unique identifier included in the low-data message and determining the social media account associated with the unique identifier. Moreover, act 610 can include any of the actions described above in regard to step 210 of FIG. 2A.

Method 600 can also involve an act 615 of generating a social media communication. For example, act 615 can include generating a social media communication using the identified content from the low-data message. In particular, act 615 can include generating the social media communication according to the analysis performed by the social networking system 104 on the low-data message. For example, act 615 can include generating the social media communication according to identified one or more commands. Additionally, act 615 can include generating the social media communication according to a determined meaning of the identified content of the low-data message. Moreover, act 615 can include any of the actions described above in regard to step 222 of FIG. 2A.

Furthermore, method 600 can involve an act 620 of providing the social media communication. For example, act 620 can include providing the social media communication to a co-user of the social networking system. In some embodiments, act 620 can include adding the social media communication to a social media account of a social networking system 104. In particular, act 620 can include posting the social media communication to a feed of the social media account. Additionally, act 620 can include adding the social media communication to a communication thread between an additional user and the social media account. Also, act 620 can include any of the actions described above in regard to step 224 of FIG. 2B.

Moreover, in some embodiments, method 600 can involve providing a prompt to the user to create the social media communication and receiving the low-data message in response to the prompt. Furthermore, providing the prompt can include providing the prompt within at least one of a low-data message or a notification. In further embodiments, method 600 can include determining a likelihood that the user is interested in creating the social media communication and providing the prompt to the user in response to determining the likelihood that the user is interested in creating the social media communication. In additional embodiments, method 600 can include detecting a user interaction by the co-user of the social networking system with the social media communication, generating a second low-data message to notify the user of the detected user interaction with the social media communication, and sending the second low-data message to the user. In one or more embodiments, method 600 can include receiving, from the client device associated with the user in response to the second low-data message, a third low-data message including a response to the detected user interaction, generating, in response to the third low-data message, a second social media communication, and providing the second social media communication to the co-user. In some embodiments, the user interaction by the co-user includes a comment by the co-user, and wherein generating the second social media communication comprises generating a reply from the user to the comment by the co-user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
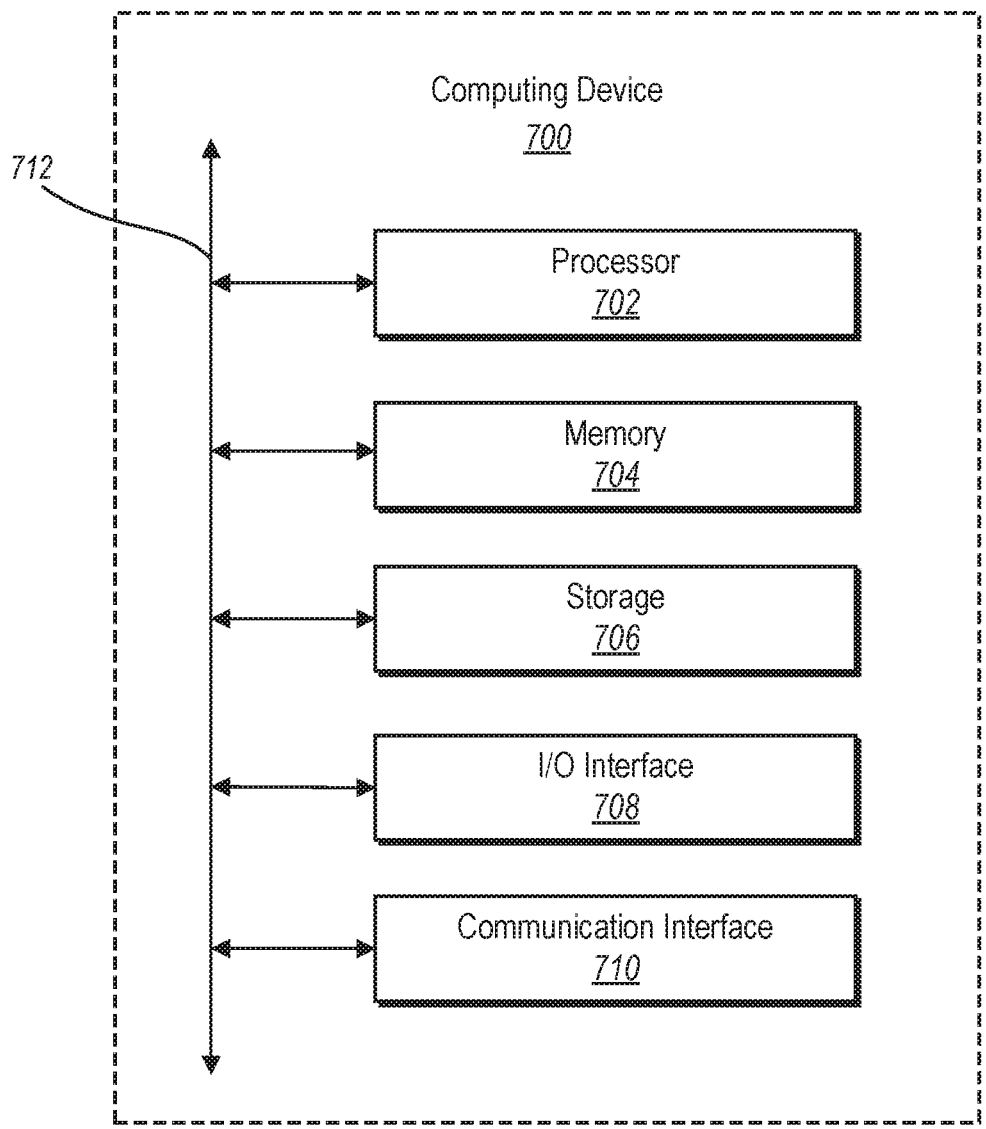
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the communication system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system 104. A social networking system 104 may enable its users (such as persons or organizations) to interact with the system and with each other. The social networking system 104 may, with input from a user, create and store in the social networking system 104 a user profile associated with the user. The user profile may include demographic information, communication-channel information, and information on personal interests of the user. The social networking system 104 may also, with input from a user, create and store a record of relationships of the user with other users of the social networking system 104, as well as provide services (e.g., posts, photo-sharing, event organization, messaging, games, or advertisements) to facilitate social interaction between or among users.

The social networking system 104 may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system 104. A user may be an individual (human user), an entity (e.g., an enterprise, business, or third party application), or a group (e.g., of individuals or entities). A user node corresponding to a user may comprise information provided by the user and information gathered by various systems, including the social networking system 104.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system 104 can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system 104. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system 104 to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system 104 can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system 104 may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system 104 a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system 104 to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system 104 may support a variety of applications, such as photo sharing, on-line calendars and events, gaming, instant messaging, and advertising. For example, the social networking system 104 may also include media sharing capabilities. Also, the social networking system 104 may allow users to post photographs and other multimedia content items to a user's profile page (typically known as "wall posts" or "timeline posts") or in a photo album, both of which may be accessible to other users of the social networking system 104 depending upon the user's configured privacy settings. The social networking system 104 may also allow users to configure events. For example, a first user may configure an event with attributes including time and date of the event, location of the event and other users invited to the event. The invited users may receive invitations to the event and respond (such as by accepting the invitation or declining it). Furthermore, the social networking system 104 may allow users to maintain a personal calendar. Similarly to events, the calendar entries may include times, dates, locations and identities of other users.

Figure 8:
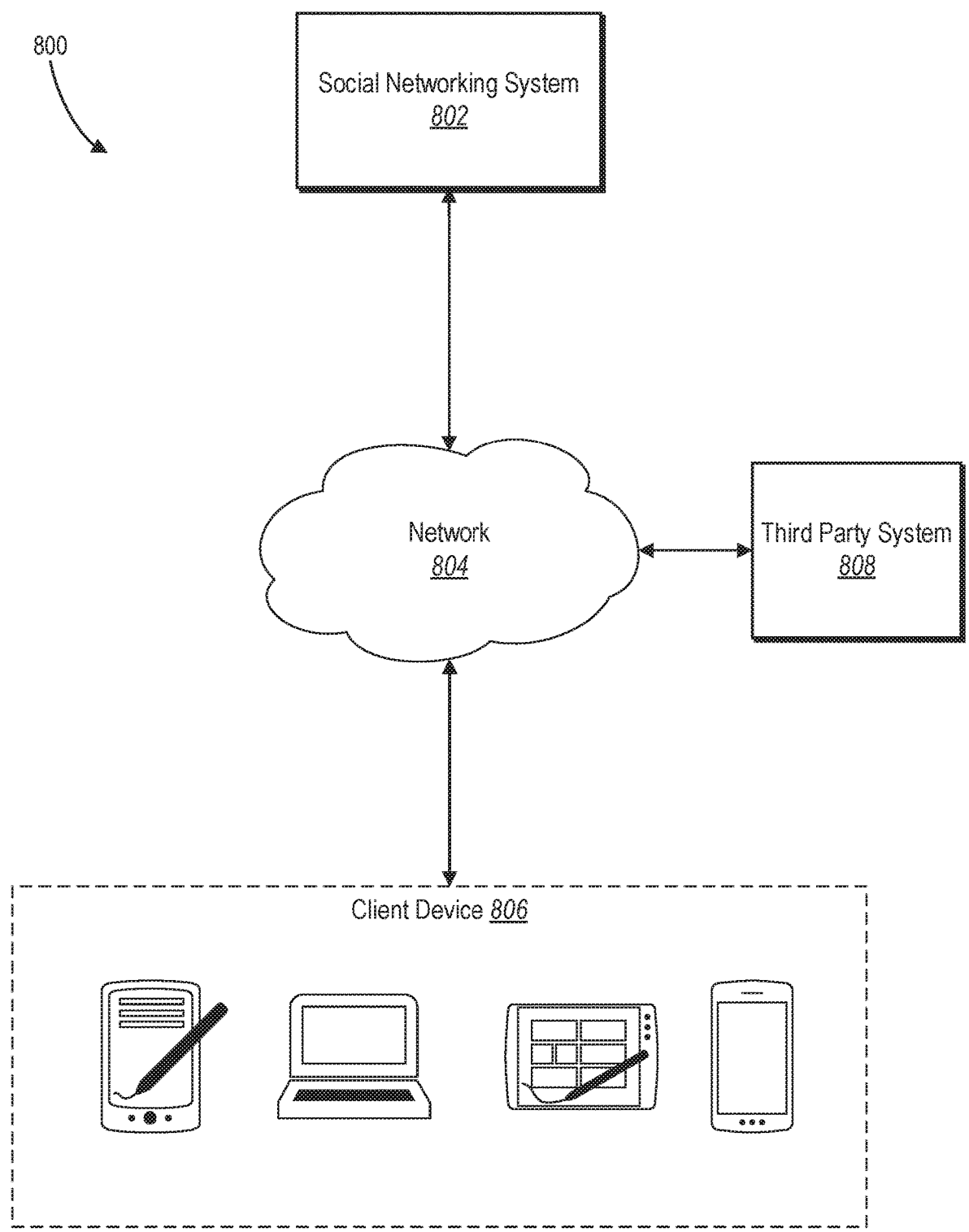
FIG. 8 illustrates an example network environment of a social networking system in accordance with one or more embodiments.

FIG. 8 illustrates an example network environment 800 of a social networking system 802 (which may represent an example of social networking system 104). Network environment 800 includes a client device 806, a social networking system 802, and a third party system 808 connected to each other by a network 804. Although FIG. 8 illustrates a particular arrangement of client device 806, social networking system 802, third party system 808, and network 804, this disclosure contemplates any suitable arrangement of client device 806, social networking system 802, third party system 808, and network 804. As an example and not by way of limitation, two or more of client device 806, social networking system 802, and third party system 808 may be connected to each other directly, bypassing network 804. As another example, two or more of client device 806, social networking system 802, and third party system 808 may be physically or logically co-located with each other in whole or in part. Moreover, although FIG. 8 illustrates a particular number of client devices 806, social networking systems 802, third party system 808, and networks 804, this disclosure contemplates any suitable number of client devices 806, social networking systems 802, third party system 808, and networks 804. As an example and not by way of limitation, network environment 800 may include multiple client device 806, social networking systems 802, third party system 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client device 806, social networking system 802, and third party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client device 806 may be an electronic device including hardware, software, or embedded logic components or a combination of two or more such components and capable of carrying out the appropriate functionalities implemented or supported by client device 806. As an example and not by way of limitation, a client device 806 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 806. A client device 806 may enable a network user at client device 806 to access network 804. A client device 806 may enable its user to communicate with other users at other client devices 806.

In particular embodiments, client device 806 may include a web browser, such as MICROSOFT INTERNET EXPLORER, GOOGLE CHROME or MOZILLA FIREFOX, and may have one or more add-ons, plugins, or other extensions, such as TOOLBAR or YAHOO TOOLBAR. A user at client device 806 may enter a Uniform Resource Locator (URL) or other address directing the web browser to a particular server (such as server, or a server associated with a third party system 808), and the web browser may generate a Hyper Text Transfer Protocol (HTTP) request and communicate the HTTP request to server. The server may accept the HTTP request and communicate to client device 806 one or more Hyper Text Markup Language (HTML) files responsive to the HTTP request. Client device 806 may render a web page based on the HTML files from the server for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, social networking system 802 may be a network-addressable computing system that can host an online social network. Social networking system 802 may generate, store, receive, and send social-networking data, such as, for example, user-profile data, concept-profile data, social-graph information, or other suitable data related to the online social network. Social networking system 802 may be accessed by the other components of network environment 800 either directly or via network 804. In particular embodiments, social networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 806, a social networking system 802, or a third party system 808 to manage, retrieve, modify, add, or delete, the information stored in data store.

In particular embodiments, social networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 802 may provide users of the online social network the ability to communicate and interact with other users. In particular embodiments, users may join the online social network via social networking system 802 and then add connections (e.g., relationships) to a number of other users of social networking system 802 whom they want to be connected to. Herein, the term "friend" may refer to any other user of social networking system 802 with whom a user has formed a connection, association, or relationship via social networking system 802.

In particular embodiments, social networking system 802 may provide users with the ability to take actions on various types of items or objects, supported by social networking system 802. As an example and not by way of limitation, the items and objects may include groups or social networks to which users of social networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 802 or by an external system of third party system 808, which is separate from social networking system 802 and coupled to social networking system 802 via a network 804.

In particular embodiments, social networking system 802 may be capable of linking a variety of entities. As an example and not by way of limitation, social networking system 802 may enable users to interact with each other as well as receive content from third party system 808 or other entities, or to allow users to interact with these entities through an application programming interfaces (API) or other communication channels.

In particular embodiments, a third party system 808 may include one or more types of servers, one or more data stores, one or more interfaces, including but not limited to APIs, one or more web services, one or more content sources, one or more networks, or any other suitable components, e.g., that servers may communicate with. For example, the third party system 808 can include a third party messaging system through which the client device 806 can send messages (e.g., SMS messages, iMessages, etc.) to the social networking system 802. In some instances, the third party system 808 may be operated by a different entity from an entity operating social networking system 802. In particular embodiments, however, social networking system 802 and third party system 808 may operate in conjunction with each other to provide social-networking services to users of social networking system 802 or third party system 808. In this sense, social networking system 802 may provide a platform, or backbone, which other systems, such as third party system 808, may use to provide social-networking services and functionality to users across the Internet.

In additional embodiments, the third party system 808 may include a third party content object provider. The third party content object provider may include one or more sources of content objects, which may be communicated to a client device 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 802 also includes user-generated content objects, which may enhance a user's interactions with social networking system 802. User-generated content may include anything a user can add, upload, send, or "post" to social networking system 802. As an example and not by way of limitation, a user communicates posts to social networking system 802 from a client device 806. Posts may include data such as status updates or other textual data, location information, photos, videos, links, music or other similar data or media. Content may also be added to social networking system 802 by a third party through a "communication channel," such as a newsfeed or stream.

In particular embodiments, social networking system 802 may include a variety of servers, sub-systems, programs, modules, logs, and data stores. In particular embodiments, social networking system 802 may include one or more of the following: a web server, action logger, API-request server, relevance-and-ranking engine, content-object classifier, notification controller, action log, third party-content-object-exposure log, inference module, authorization/privacy server, search module, advertisement-targeting module, user-interface module, user-profile store, connection store, third party content store, or location store. Social networking system 802 may also include suitable components such as network interfaces, security mechanisms, load balancers, failover servers, management-and-network-operations consoles, other suitable components, or any suitable combination thereof. In particular embodiments, social networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 802 to one or more client devices 806 or one or more third party system 808 via network 804. The web server may include a mail server or other messaging functionality for receiving and routing messages between social networking system 802 and one or more client devices 806. An API-request server may allow a third party system 808 to access information from social networking system 802 by calling one or more APIs. An action logger may be used to receive communications from a web server about a user's actions on or off social networking system 802. In conjunction with the action log, a third party-content-object log may be maintained of user exposures to third party-content objects. A notification controller may provide information regarding content objects to a client device 806. Information may be pushed to a client device 806 as notifications, or information may be pulled from client device 806 responsive to a request received from client device 806. Authorization servers may be used to enforce one or more privacy settings of the users of social networking system 802. A privacy setting of a user determines how particular information associated with a user can be shared. The authorization server may allow users to opt in to or opt out of having their actions logged by social networking system 802 or shared with other systems (e.g., third party system 808), such as, for example, by setting appropriate privacy settings. Third party-content-object stores may be used to store content objects received from third parties, such as a third party system 808. Location stores may be used for storing location information received from client devices 806 associated with users. Advertisement-pricing modules may combine social information, the current time, location information, or other suitable information to provide relevant advertisements, in the form of notifications, to a user.

Figure 9:
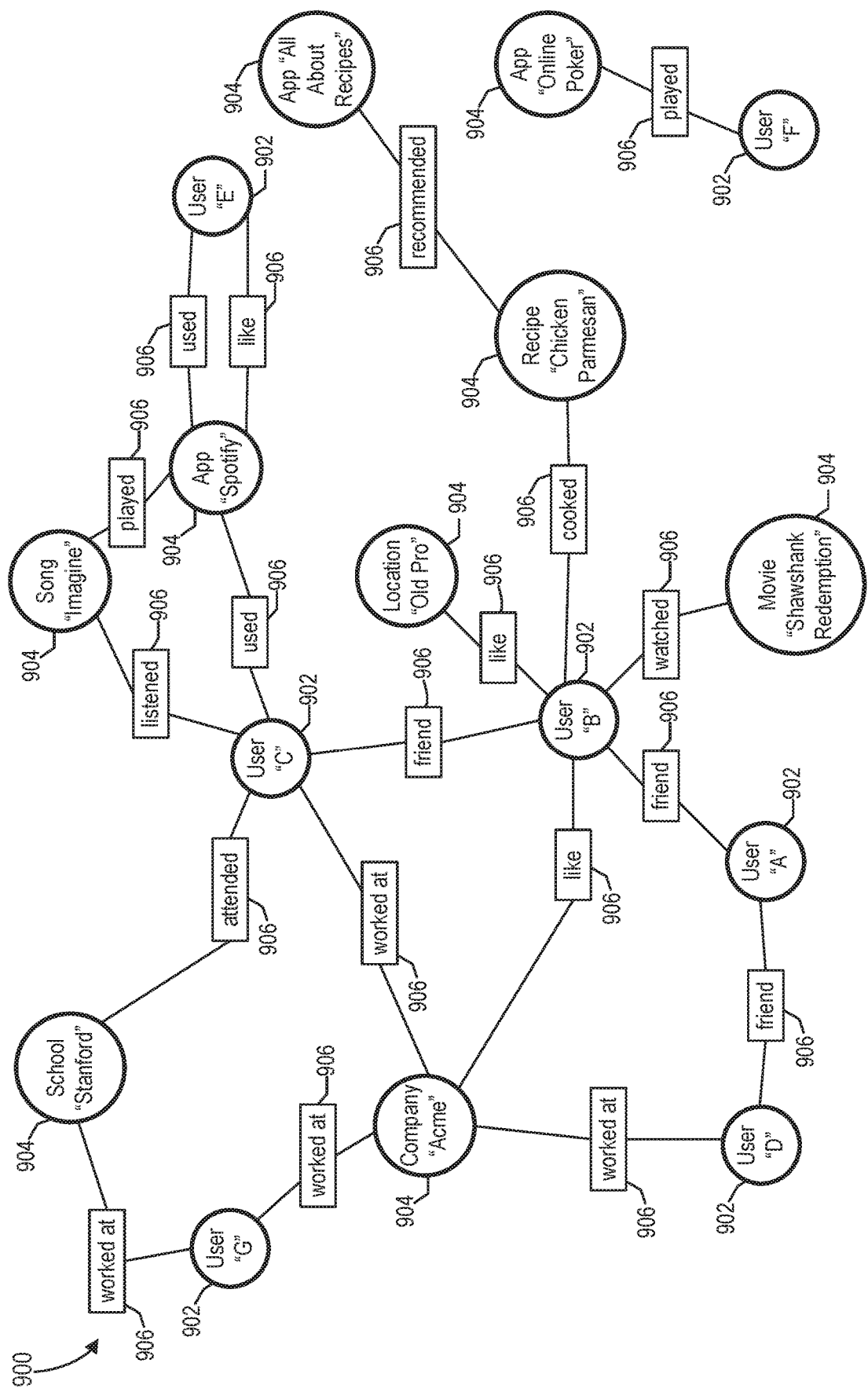
FIG. 9 illustrates a social graph in accordance with one or more embodiments.

FIG. 9 illustrates example social graph 900. Referring to FIGS. 8 and 9 together, in particular embodiments, social networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social networking system 802, client device 806, or third party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social networking system 802. As an example and not by way of limitation, a user may be an individual (human user), an entity (e.g., an enterprise, business, or third party application), or a group (e.g., of individuals or entities) that interacts or communicates with or over social networking system 802. In particular embodiments, when a user registers for an account with social networking system 802, social networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social networking system 802. In particular embodiments, a user node 902 may be associated with information provided by a user or information gathered by various systems, including social networking system 802. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more web pages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third party website associated with a web-application server); an entity (such as, for example, a person, business, group, sports team, or celebrity); a resource (such as, for example, an audio file, video file, digital photo, text file, structured document, or application) which may be located within social networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more web pages.

In particular embodiments, a node in social graph 900 may represent or be represented by a web page (which may be referred to as a "profile page"). Profile pages may be hosted by or accessible to social networking system 802. Profile pages may also be hosted on third party websites associated with a third party server 808. As an example and not by way of limitation, a profile page corresponding to a particular external web page may be the particular external web page and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third party web page or resource hosted by a third party system 808. The third party web page or resource may include, among other elements, content, a selectable or other icon, or other inter-actable object (which may be implemented, for example, in JavaScript, AJAX, or PHP codes) representing an action or activity. As an example and not by way of limitation, a third party web page may include a selectable icon such as "like," "check in," "eat," "recommend," or another suitable action or activity. A user viewing the third party web page may perform an action by selecting one of the icons (e.g., "eat"), causing a client device to send to social networking system 802 a message indicating the user's action. In response to the message, social networking system 802 may create an edge (e.g., an "eat" edge) between a user node 902 corresponding to the user and a concept node 904 corresponding to the third party web page or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social networking system 802 may send a "friend request" to the second user. If the second user confirms the "friend request," social networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social networking system 802 may create an edge 906 between a user node 902 and a concept node 904 in social graph 900. As an example and not by way of limitation, a user viewing a concept-profile page (such as, for example, by using a web browser or a special-purpose application hosted by the user's client device 806) may indicate that he or she likes the concept represented by the concept node 904 by clicking or selecting a "Like" icon, which may cause the user's client device 806 to send to social networking system 802 a message indicating the user's liking of the concept associated with the concept-profile page. In response to the message, social networking system 802 may create an edge 906 between user node 902 associated with the user and concept node 904, as illustrated by "like" edge 906 between the user and concept node 904. In particular embodiments, social networking system 802 may store an edge 906 in one or more data stores. In particular embodiments, an edge 906 may be automatically formed by social networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system web pages, third party web pages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 802) or RSVP (e.g., through social networking system 802) to an event associated with the advertisement. In addition or as an alternative, an advertisement may include social-networking-system context directed to the user. As an example and not by way of limitation, an advertisement may display information about a friend of the user within social networking system 802 who has taken an action associated with the subject matter of the advertisement.

In particular embodiments, social networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part by the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 802 may calculate a coefficient based on a user's actions. Social networking system 802 may monitor such actions on the online social network, on a third party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 802 may calculate a coefficient based on the user's actions with particular types of content. The content may be associated with the online social network, a third party system 908, or another suitable system. The content may include users, profile pages, posts, news stories, headlines, instant messages, chat room conversations, emails, advertisements, pictures, video, music, other suitable objects, or any combination thereof. Social networking system 802 may analyze a user's actions to determine whether one or more of the actions indicate an affinity for subject matter, content, other users, and so forth. As an example and not by way of limitation, if a user may make frequently posts content related to "coffee" or variants thereof, social networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 802 may calculate a coefficient based on the type of relationship between particular objects. Referencing the social graph 900, social networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 802 may determine that the user has a higher coefficient with respect to the first photo than the second photo because having a tagged-in-type relationship with content may be assigned a higher weight and/or rating than having a like-type relationship with content. In particular embodiments, social networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 802 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device of the user). A first user may be more interested in other users or concepts that are closer to the first user. As an example and not by way of limitation, if a user is one mile from an airport and two miles from a gas station, social networking system 802 may determine that the user has a higher coefficient for the airport than the gas station based on the proximity of the airport to the user.

In particular embodiments, social networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 802 may provide information that is relevant to user's interests and current circumstances, increasing the likelihood that they will find such information of interest. In particular embodiments, social networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third party system 808 (e.g., via an API or other communication channel), or from another suitable system. In response to the request, social networking system 802 may calculate the coefficient (or access the coefficient information if it has previously been calculated and stored). In particular embodiments, social networking system 802 may measure an affinity with respect to a particular process. Different processes (both internal and external to the online social network) may request a coefficient for a particular object or set of objects. Social networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social networking system 802 or shared with other systems (e.g., third party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third party systems 908, particular applications (e.g., third party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 802 may send a request to the data store for the object. The request may identify the user associated with the request and may only be sent to the user (or a client device of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
    receiving a first low-data message from a client device associated with a user of a social networking system, wherein the first low-data message comprises at least one of an instant message or a text message;
    analyzing the first low-data message comprising the at least one of the instant message or the text message to identify content from the at least one of the instant message or the text message to include in a social media post as part of one or more social networking feeds;
    generating the social media post using the identified content from the at least one of the instant message or the text message;
    providing the social media post to a co-user of the social networking system as part of a social networking feed associated with the co-user of the social networking system;
    detecting a comment by the co-user of the social networking system with regard to the social media post;

generating a second low-data message comprising the comment by the co-user of the social networking system with regard to the social media post corresponding to the social networking feed;
sending the second low-data message to the client device associated with the user of the social networking system;
receiving, from the client device associated with the user, in response to the second low-data message, a third low-data message including a response to the comment by the co-user of the social networking system with the social media post;
generating, in response to the third low-data message, a second comment on the social media post;
providing the second comment to the co-user as part of the social media post of the social networking feed associated with the co-user of the social networking system; and
providing the first low-data message, the second low-data message comprising the comment by the co-user of the social networking system with regard to the social media post, and the third low-data message for display within a low-data messaging thread of a user interface on the client device.

2. The method of claim 1, further comprising:
providing a prompt to the user to create the social media post; and
receiving the first low-data message in response to the prompt.

3. The method of claim 2, wherein providing the prompt comprises providing the prompt within another low-data message.

4. The method of claim 2, further comprising:
determining a likelihood that the user is interested in creating the social media post; and
providing the prompt to the user in response to determining the likelihood that the user is interested in creating the social media post.

5. The method of claim 1, further comprising providing, for display, a notification of the second low-data message to the client device associated with the user of the social networking system.

6. The method of claim 1, wherein the first low-data message further comprises a user indicator identifying one or more users to tag in the social media post.

7. The method of claim 1, wherein the client device associated with the user is not connected to a data network.

8. The method of claim 1, further comprising providing the social media post and the second comment without the client device associated with the user accessing a web browser or social media specific application.

9. The method of claim 1, further comprising analyzing the first low-data message to identify one or more action commands within the first low-data message.

10. The method of claim 9, further comprising generating the social media post in response to identifying the one or more action commands within the first low-data message.

11. The method of claim 1, further comprising analyzing the first low-data message using natural language processing to determine a meaning of the first low-data message.

12. The method of claim 1, wherein the first low-data message comprises at least one of a short message service (SMS) message, a multimedia messaging service (MMS) message, an extensible messaging and presence protocol (XMPP) message, a session initiation protocol (SIP) message, an internet relay chat (IRC) message, or an enhanced message service (EMS) message.

13. A system comprising:
at least one processor; and
at least one non-transitory computer-readable storage medium storing instructions thereon that, when executed by the at least one processor, cause the system to:
receive a first low-data message from a client device associated with a user of a social networking system, wherein the first low-data message comprises at least one of an instant message or a text message;
analyze the first low-data message comprising the at least one of the instant message or the text message to identify content from the at least one of the instant message or the text message to include in a social media post as part of one or more social networking feeds;
generate the social media post using the identified content from the at least one of the instant message or the text message;
provide the social media post to a co-user of the social networking system as part of a social networking feed associated with the co-user of the social networking system;
detect a comment by the co-user of the social networking system with regard to the social media post;
generate a second low-data message comprising the comment by the co-user of the social networking system with regard to the social media post corresponding to the social networking feed;
send the second low-data message to the client device associated with the user of the social networking system;
receive, from the client device associated with the user, in response to the second low-data message, a third low-data message including a response to the comment by the co-user of the social networking system with the social media post;
generate, in response to the third low-data message, a second comment on the social media post;
provide the second comment to the co-user as part of the social media post of the social networking feed associated with the co-user of the social networking system; and
provide the first low-data message, the second low-data message comprising the comment by the co-user of the social networking system with regard to the social media post, and the third low-data message for display within a low-data messaging thread of a user interface on the client device.

14. The system of claim 13, further comprising instructions thereon that, when executed by the at least one processor, cause the system to:
provide a prompt to the user to create the social media post; and
receive the first low-data message in response to the prompt.

15. The system of claim 14, wherein providing the prompt comprises providing the prompt within at least one of an additional low-data message or a notification.

16. The system of claim 13, wherein analyzing the first low-data message comprises determining a meaning of the content from the first low-data message.

17. The system of claim 13, wherein the first low-data message comprises at least one of a short message service (SMS) message, a multimedia messaging service (MMS) message, an extensible messaging and presence protocol (XMPP) message, a session initiation protocol (SIP) message, an internet relay chat (IRC) message, or an enhanced message service (EMS) message.

18. The system of claim 13, further comprising instructions that, when executed by the at least one processor, cause the system to receive the first low-data message via a routing number to which the client device can send the low-data message.

19. A non-transitory computer readable medium storing instructions thereon that, when executed by at least one processor, cause the at least one processor to perform steps comprising:
- receiving a first low-data message from a client device associated with a user of a social networking system, wherein the first low-data message comprises at least one of an instant message or a text message;
- analyzing the first low-data message comprising the at least one of the instant message or the text message to identify content from the at least one of the instant message or the text message to include in a social media post;
- generating the social media post using the identified content from the at least one of the instant message or the text message;
- providing the social media post to a co-user of the social networking system as part of a social networking feed associated with the co-user of the social networking system;
- detecting a comment by the co-user of the social networking system with regard to the social media post;
- generating a second low-data message comprising the comment by the co-user of the social networking system with regard to the social media post corresponding to the social networking feed;
- sending the second low-data message to the client device associated with the user of the social networking system;
- receiving, from the client device associated with the user, in response to the second low-data message, a third low-data message including a response to the comment by the co-user of the social networking system with the social media post;
- generating, in response to the third low-data message, a second comment on the social media post;
- providing the second comment to the co-user as part of the social media post of the social networking feed associated with the co-user of the social networking system; and
- providing the first low-data message, the second low-data message comprising the comment by the co-user of the social networking system with regard to the social media post, and the third low-data message for display within a low-data messaging thread of a user interface on the client device.

20. The non-transitory computer readable medium of claim 19, further comprising instructions thereon that, when executed by the at least one processor, cause the at least one processor to further perform steps of: receiving the first low-data message via a routing number to which the client device can send the low-data message.

* * * * *